United States Patent
Thresher et al.

(10) Patent No.: US 10,066,595 B2
(45) Date of Patent: Sep. 4, 2018

(54) WAVE ENERGY CONVERSION INCORPORATING ACTUATED GEOMETRY

(71) Applicant: Alliance for Sustainable Energy, LLC, Golden, CO (US)

(72) Inventors: Robert Thresher, Golden, CO (US); Michael Lawson, Golden, CO (US); Nathan Tom, Golden, CO (US); Jason Cotrell, Golden, CO (US); Yi-Hsiang Yu, Golden, CO (US); Alan Wright, Golden, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 47 days.

(21) Appl. No.: 15/088,818

(22) Filed: Apr. 1, 2016

(65) Prior Publication Data
US 2016/0290311 A1    Oct. 6, 2016

Related U.S. Application Data

(60) Provisional application No. 62/142,113, filed on Apr. 2, 2015.

(51) Int. Cl.
| | |
|---|---|
| *F03B 13/16* | (2006.01) |
| *F03B 13/20* | (2006.01) |
| *F03B 13/14* | (2006.01) |
| *F03B 13/18* | (2006.01) |

(52) U.S. Cl.
CPC ............ *F03B 13/16* (2013.01); *F03B 13/142* (2013.01); *F03B 13/182* (2013.01); *F03B 13/20* (2013.01); *F05B 2250/00* (2013.01); *F05B 2250/02* (2013.01); *F05B 2270/20* (2013.01); *F05B 2270/30* (2013.01); *F05B 2270/324* (2013.01); *F05B 2270/325* (2013.01); *Y02E 10/32* (2013.01); *Y02E 10/38* (2013.01)

(58) Field of Classification Search
CPC ........ F03B 13/16; F03B 13/20; F03B 13/182; F03B 13/142; Y02E 10/32; Y02E 10/38; F05B 2270/325; F05B 2250/00; F05B 2270/324; F05B 2270/30; F05B 2270/20; F05B 2250/02
USPC .................. 60/398, 495–507; 290/42, 53
See application file for complete search history.

(56) References Cited

U.S. PATENT DOCUMENTS

| | | | | |
|---|---|---|---|---|
| 4,095,423 A | * | 6/1978 | Gorlov .................. | F03B 13/266 405/76 |
| 4,098,081 A | * | 7/1978 | Woodman ............. | F03B 13/266 417/100 |
| 4,141,670 A | * | 2/1979 | Russell ................. | F03B 13/145 290/53 |
| 4,210,821 A | * | 7/1980 | Cockerell ............... | F03B 13/20 290/53 |
| 4,466,244 A | * | 8/1984 | Wu ....................... | F03B 13/142 417/100 |

(Continued)

*Primary Examiner* — Hoang Nguyen
(74) *Attorney, Agent, or Firm* — Robert G. Pittelkow

(57) ABSTRACT

Described herein are wave energy conversion systems including actuated geometry components. An example system may include at least one body portion configured to transfer wave energy to a power take off device, and at least one actuated geometry component that is connected to the at least one body portion, the at least one actuated geometry component operable to modify a geometric profile of the system.

14 Claims, 20 Drawing Sheets

(56) References Cited

U.S. PATENT DOCUMENTS

| | | | | | |
|---|---|---|---|---|---|
| 4,622,473 | A | * | 11/1986 | Curry | F03B 13/187 290/1 R |
| 6,812,588 | B1 | * | 11/2004 | Zadig | F03B 13/187 290/53 |
| 7,525,214 | B2 | * | 4/2009 | Atilano Medina | F03B 13/186 290/42 |
| 7,808,120 | B2 | * | 10/2010 | Smith | F03B 13/1815 290/42 |
| 7,830,032 | B1 | * | 11/2010 | Breen | F03B 13/142 290/53 |
| 8,030,789 | B2 | * | 10/2011 | Ortiz | F03B 13/142 290/42 |
| 8,525,364 | B1 | * | 9/2013 | Costas | F03B 13/22 290/42 |
| 2010/0148504 | A1 | * | 6/2010 | Gerber | F03B 13/16 290/42 |

* cited by examiner

WAVE ENERGY CONVERSION INCORPORATING ACTUATED GEOMETRY

This application claims the benefit of U.S. Provisional Application No. 62/142,113, filed Apr. 2, 2015, the entire content of which is incorporated herein by reference.

CONTRACTUAL ORIGIN

The United States Government has rights in this invention under Contract No. DE-AC36-08GO28308 between the United States Department of Energy and Alliance for Sustainable Energy, LLC, the Manager and Operator of the National Renewable Energy Laboratory.

BACKGROUND

Over the past decade, the marine hydrokinetic energy sector has experienced a resurgence in funding and manpower allocated towards research and development. As a whole, the field of wave energy continues to host a wide diversity of technologies ranging in scale from concept to prototype.

Work on nearshore, wave energy conversion (WEC) devices has focused largely on designs that include a fixed geometrical body and rely on control of the power-take-off (PTO) system to further optimize power absorption.

SUMMARY

In one example, a system includes at least one body portion configured to transfer wave energy to a power take off device, and at least one actuated geometry component that is connected to the at least one body portion, the at least one actuated geometry component operable to modify a geometric profile of the system.

In another example, a method includes harvesting wave energy using a wave energy conversion system that includes at least one actuated geometry component, receiving, by a processor, at least one environmental condition value, and determining, by the processor, whether the at least one environmental condition value surpasses a threshold. The method may further include, responsive to determining that the at least one environmental condition surpasses the threshold, modifying, by the processor and based on the at least one environmental condition value, a geometric profile of the wave energy conversion system by operating the at least one actuated geometry component.

The details of one or more examples are set forth in the accompanying drawings and the description below. Other features, objects, and advantages will be apparent from the description and drawings, and from the claims.

DETAILED DESCRIPTION

Figure 1:
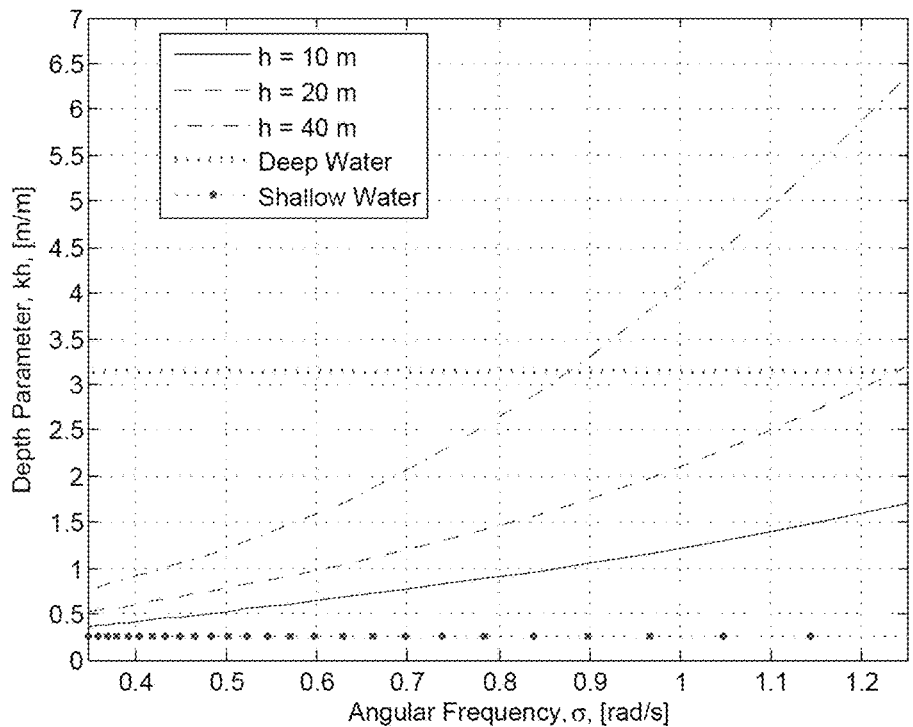
FIG. 1 is a graphical plot illustrating depth parameter versus wave angular frequency.

The present disclosure provides wave energy conversion systems and devices that have a broad effective operating range and that are better able to handle hydrodynamic load variation by incorporating actuated geometry. Actuated geometry, as used herein, refers to components, surfaces, or other structures that are moveable to change the geometry of a system or device. Examples of changing device geometry may include creating negative space (e.g., openings or "holes") within a device, modifying a profile of a device with respect to a free surface, increasing or decreasing a surface area to volume ratio of a device, or making other geometrical changes to a device. As one example, a WEC system may include actuated geometry that can be manually or automatically controlled and/or that may move in response to external conditions such as weather or sea state. In this example, the actuated geometry may change the dynamic characteristics of the device, enabling the WEC to avoid overloading during rough seas conditions and/or to better optimize energy conversion performance.

WEC designs, as well as material costs, have generally been driven by the large hydrodynamic loads that such systems need to be able to withstand. Numerous and diverse related art technologies have been proposed. However, few appear strong enough and versatile enough to gain widespread penetration. As one example, many WEC systems are narrow banded, with high extraction efficiencies only around a small frequency range about the resonance period. The diverse but narrowly useful technologies available today highlight the need for a structured innovation approach to the development of wave energy conversion systems, to achieve an optimal convergence in overall design and operation.

Typical of many related art WEC designs are large hydrodynamic loads, specifically the added inertia arising from radiation effects. The added moment of inertia can shift the resonance period of such devices outside the wave range of 5-20 s. In addition, without active power-take-off control measures, the optimum conditions for power extraction may be difficult to maintain, especially in irregular waves. Therefore, pursuing active-controllable geometries may allow for greater power optimization and load shedding for continued operation in larger sea states.

Various aspects of the present disclosure address issues in the art by providing new device concepts that combine WEC devices and systems with active control surfaces (i.e., actuated geometry). In some examples, the active control surfaces may act similar to air foils. By incorporating actuated geometry as described herein, a wave energy conversion device may be able to modify its device profile to reduce hydrodynamic loading on the device. In addition, actuated geometry may allow a device to tune its hydrodynamic characteristics to match its resonance period with the current sea state, thereby broadening the effective operating range of the device. As a result, wave energy conversion devices incorporating active geometry as described herein may operate in larger sea states, where amplitude or structural loading constraints may render related art designs unfeasible or even impossible. In other words, by using the techniques described herein, wave energy conversion devices and systems may be better able to handle variation in surrounding weather and water conditions, while reducing overall cost.

Generally, the hydrodynamic properties of a WEC device, and propagating power available, will be affected by the water depth, h. From linear potential theory, the incident wave potential, $\phi_I$, for a right propagating wave is given by:

$$\phi_I = \Re\left\{ \frac{igA}{\sigma} \frac{\cosh kz}{\cosh kh} e^{(i\sigma t - k(x\cos\beta + y\sin\beta))} \right\}, \quad (1)$$

where $\sigma$ is the wave angular frequency, g is gravitational acceleration, k is the wave number, A is the wave amplitude, $\beta$ is the wave heading measured counter clockwise from the positive x-axis, and i is the imaginary unit ($i=\sqrt{-1}$). Due to the combined free surface boundary condition:

$$\frac{\partial^2 \phi_I}{\partial t^2} + g\frac{\partial \phi_I}{\partial z} = 0, \quad (2)$$

the relationship between the wave number and the wave angular frequency may be calculated by the dispersion relation:

$$\sigma^2 = gk \tan hkh, \quad (3)$$

where the solution of Equation (3) can be found in FIG. 1.

Figure 2:
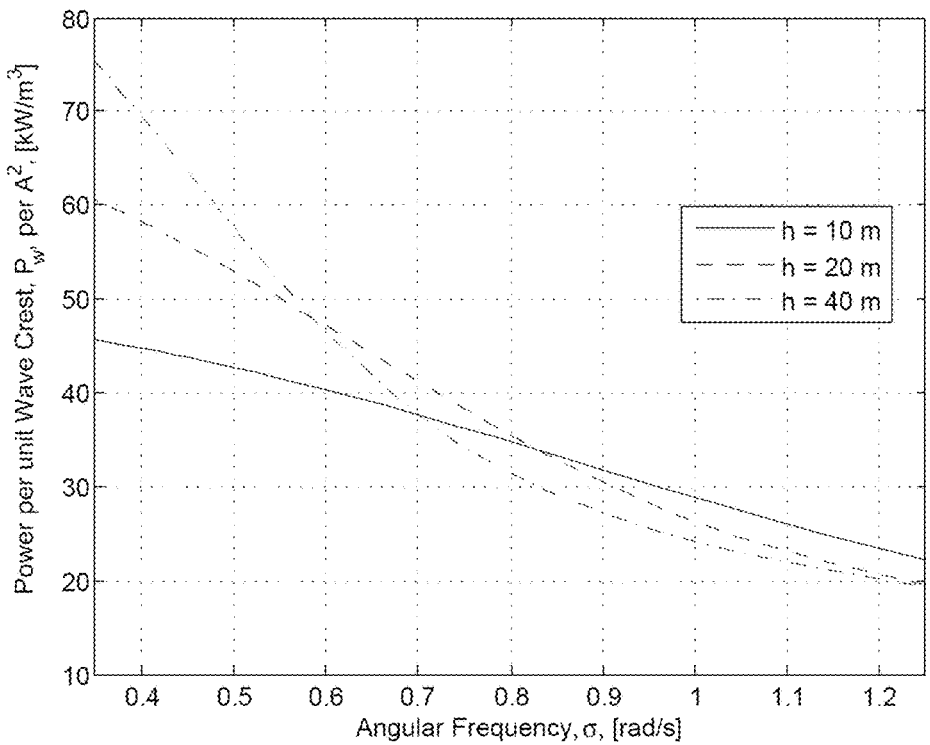
FIG. 2 is a graphical plot illustrating power versus wave angular frequency.

The time-averaged power per unit width, $P_w$, contained within a propagating wave can be shown to equal:

$$P_w = \tfrac{1}{2}\rho g V_g A^2, \quad (4)$$

in which $$V_g = \frac{1}{2}\sqrt{\frac{g}{k}\tanh kh}\left[1 + \frac{2kh}{\sinh 2kh}\right], \quad (5)$$

where $\rho$ is the fluid density and $V_g$ is the group velocity. A plot of power versus wave angular frequency is shown in FIG. 2, where shorter wavelengths will have greater power in shallow water while, in deep water, longer wavelengths contain significantly more power. Equation (4) assumes the waves propagate along a constant water depth. Thus, deployment along sloped sea beds should see a reduction in extractable power due to reflection and frictional losses.

Figure 3:
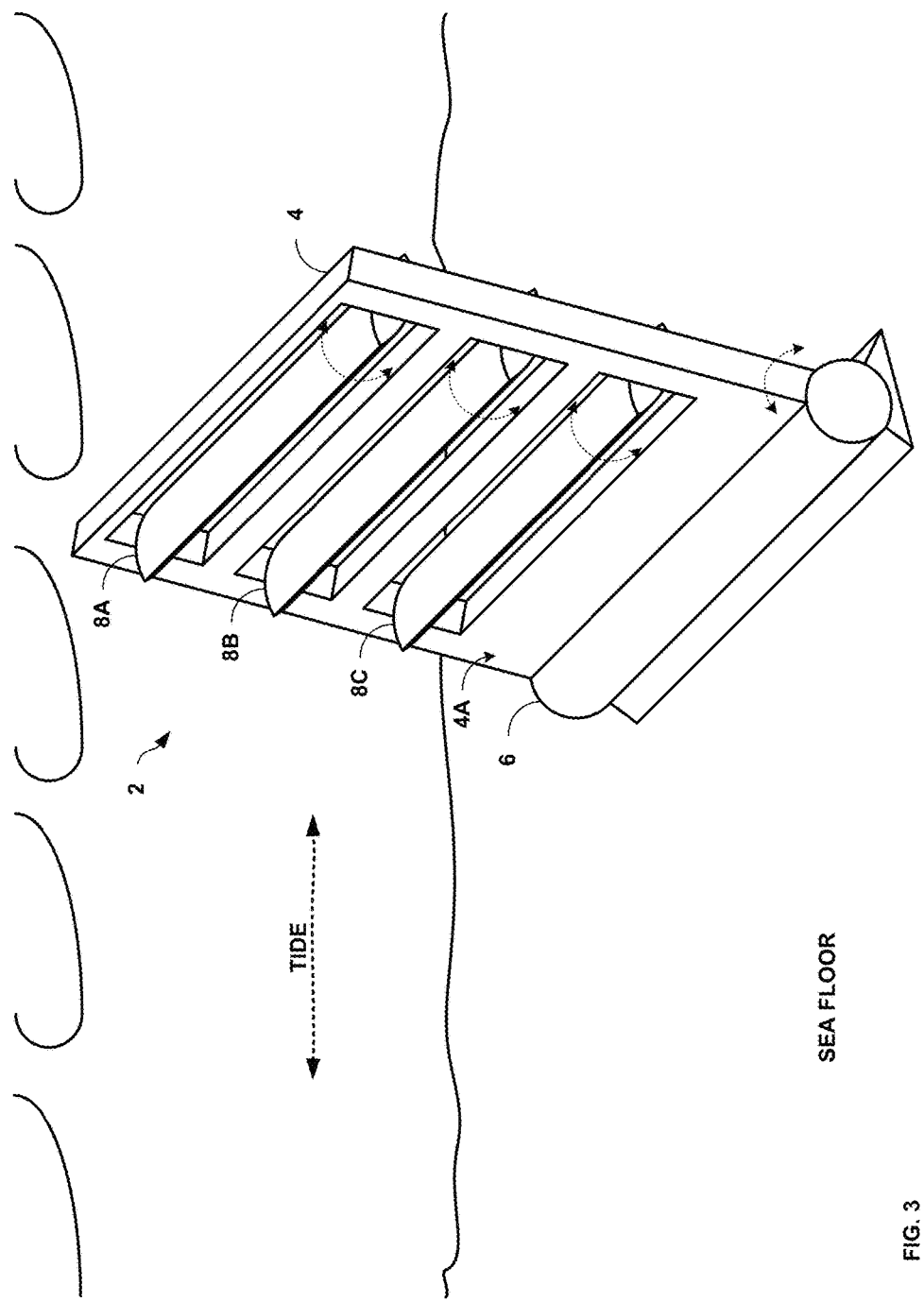
FIG. 3 is conceptual diagram illustrating an example WEC system, in accordance with one or more aspects of the present disclosure.

FIG. 3 is conceptual diagram illustrating an example WEC system (e.g., WEC system 2), in accordance with one or more aspects of the present disclosure. FIG. 3 is not to scale. WEC system 2 represents one example of an oscillating surge WEC system that incorporates actuated geometry as described herein. In the example of FIG. 3, WEC system 2 includes body 4, power take off (PTO) device 6, and actuated geometry components 8A-8C (collectively "actuated geometry components 8").

In the example of FIG. 3, body 4 is a generally a flat, plate-like structure configured to absorb wave energy by moving with surging water. Consequently, WEC system 2 may be placed in the water such that a surface of body 4 may be perpendicular to the cyclical motion generated by passing waves. As shown in FIG. 3, for instance, surface 4A of body 4 is positioned approximately perpendicular to the motion generated by the waves—left to right and right to left in FIG. 3.

As waves move the water around WEC system 2, body 4 may experience a force in the direction of the surging water. The lower edge of body 4 is attached to and rotates around PTO device 6, as shown in FIG. 3. Consequently, the waves may force body 4 to move back and forth, thereby creating rotational energy within PTO device 6.

PTO device 6, in the example of FIG. 3, may be any device capable of collecting and/or converting the energy absorbed by body 4. For instance, PTO device 6 may be an electrical generator configured to convert the rotational energy received from body 4 into electrical energy that can be stored or transmitted via electrical cables (not shown). As another example, PTO device 6 may be an air pump or compressor configured to take air from the surface and compress the air. The compressed air may then be used, for example, to run a turbine generator. In other words, PTO device 6 may be any device operable to use the rotational energy received from body 4 and convert the energy and/or store the energy for later conversion.

As shown in the example of FIG. 3, body 4 is punctuated by actuated geometry components 8. Actuated geometry components 8 may be slats that can essentially act as part of body 4 (e.g., as part of surface 4A) to receive wave energy. However, actuated geometry components 8 may be movable to effectively increase or decrease the area of surface 4A. For instance, actuated geometry components 8 may be rotated around a vector lying within the plane of surface 4A. In the example of FIG. 3, this vector is horizontal, across surface 4A. In some examples, however, actuated geometry components 8 may be rotated around a vertical vector, or around any other vector that at least approximately lies within the plane of surface 4A.

As actuated geometry components 8 are rotated, a surface of each of actuated geometry components 8 may become more or less parallel to surface 4A. Consequently, WEC system 2 may provide more or less resistance to incoming waves thereby managing the loads placed upon body 4 of WEC system 2 and/or tailoring the resonant frequency of WEC system 2.

In the example of FIG. 3, the cross-section of actuated geometry components 8 is lenticular. In some examples, actuated geometry components 8 may have a rectangular cross section, and ellipsoid or ovoid cross-section, or a cross-section of another shape. In some examples, one or more of actuated geometry components 8 may be rotated in unison. For instance, each of actuated geometry components 8A, 8B, and 8C may be rotated by substantially the same angle. In other examples, each of actuated geometry components 8 may be rotated independently or in a graded fashion. As one example, actuated geometry component 8A may be rotated while actuated geometry components 8B and 8C remain stationary. As another example, actuated geometry component 8A may be rotated a first angle, actuated geometry component 8B may be rotated a second angle, and actuated geometry component 8C may be rotated a third angle, such as 80 degrees, 40 degrees, and 20 degrees, respectively. Independent or graded rotation may allow fine-tuned control and/or more accurate load balancing.

In some examples, actuated geometry components 8 may actuate on their own. For instance, each of actuated geometry components may be shaped, be weighted, and/or use ballast such that stronger or weaker waves cause actuated geometry components 8 to actuate in order to shed excessive loading.

In some examples, actuation of actuated geometry components 8 may be controlled, such as by one or more processors or controllers (not shown). The processor(s) may be a part of WEC system 2 or may be remote from WEC system 2. In some examples, the processor(s) may control actuation of actuated geometry components 8 based on user input. For instance, a power plant manager may monitor sea conditions and provide user input to a processor that is communicatively coupled to WEC system 2. The processor may receive the user input and cause actuated geometry components 8 to rotate or move based on the user input.

In some examples, one or more processors may automatically actuate actuated geometry components 8. For instance, the processor(s) may receive environmental condition information from one or more sensors and cause actuated geometry components 8 to move based on the received environmental condition information. Examples of environmental condition information may include air temperature information, barometric pressure information, time of day, day of the year, tidal conditions, wave frequency, wave amplitude, water temperature, water depth, water content, proximity of life, or any other information about the environment surrounding WEC system 2. By monitoring the environment and actuating actuated geometry components 8 based on the changing environment, WEC system 2 may more optimally harvest wave energy while maintaining safe operating conditions.

By providing a way for WEC systems to change their geometry, the techniques described herein may allow such systems to better optimize energy collection. This may enable such systems to be deployed in a wider variety of environments. Furthermore, WEC systems that incorporate actuated geometry components in accordance with the techniques of the present disclosure may be better suited to handle harsh sea conditions, such as during storms. During such harsh conditions, related art systems are often shut down or made to operate in a very limited capacity, in order to protect the system from overloading. In contrast, because actuated geometry components can be used to modify the geometric properties of WEC systems as described herein, these systems may continue operation in sea conditions that may hinder operation of, or even destroy other systems.

Figure 4A:
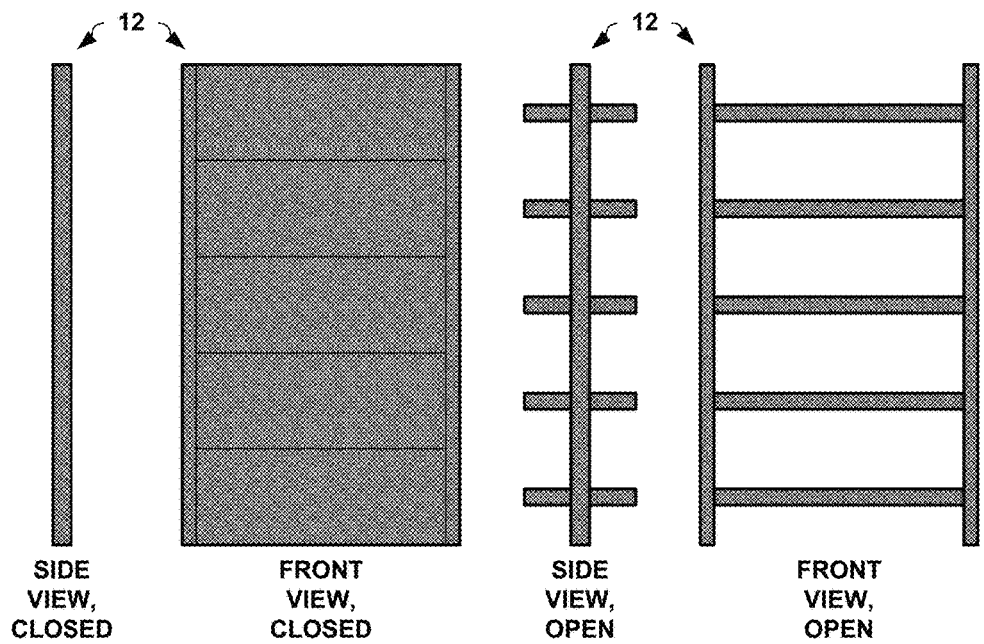
FIGS. 4A and 4B are conceptual diagrams illustrating views of a simplified WEC system, in accordance with one or more aspects of the present disclosure.
Figure 4B:
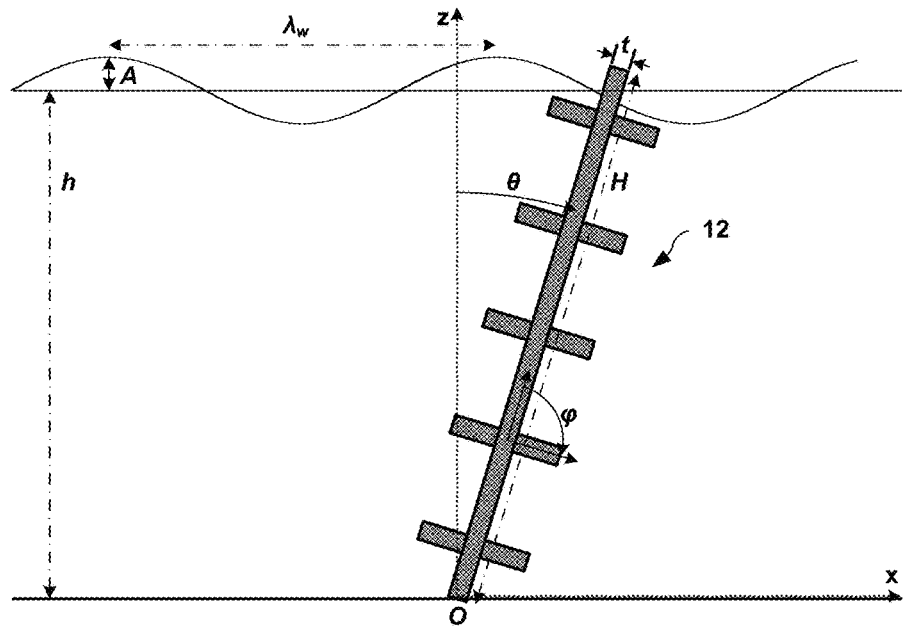

FIGS. 4A and 4B are conceptual diagrams illustrating views of a simplified WEC system (e.g., WEC system 12), in accordance with one or more aspects of the present disclosure. FIGS. 4A and 4B are not to scale. WEC system 12 represents another example of an oscillating surge WEC system that incorporates actuated geometry as described herein. FIG. 4A shows four different views of WEC system 12. Two with the actuated geometry components "closed" (left hand side of FIG. 4A) and two with the actuated geometry components "open" (right hand side of FIG. 4A). FIG. 4B shows a single view of WEC system 12, as deployed (e.g., in an ocean).

The general shape of WEC system 12 may be a simple flat plate. However, a portion of the main body of WEC system 12 is replaced by a set of identical, actuated flaps that act similar to airfoils. In some examples, the flaps of WEC system 12 are allowed to pitch freely about their center of rotation, with the flap pitch angle, φ, measured positive clockwise from the radial axis of the body, as shown in FIG. 4B.

The geometric shape of WEC system 12 may change through use of the actuated geometry components. However, if the mass is evenly distributed throughout the device, then the moment of inertia will remain constant and is given by:

$$I_{55} = 1/3 mH^2 = 1/3 \rho_m \forall H_2, \tag{6}$$

where $I_{55}$ is the moment of inertia about the origin, m is the mass of WEC system 12, H is the height of WEC system 12, $\rho_m$ is the mass density of WEC system 12, and $\forall$ is the displaced volume of WEC system 12. In the example of FIGS. 4A and 4B, the mass density is set to ½ρ to show a baseline case.

An example set of dimensions for WEC system 12 as shown in FIGS. 4A and 4B is provided in Table 1, below.

TABLE 1

| Description | Variable | Unit |
|---|---|---|
| Water Depth | h | 10 m |
| WEC Body Height | H | 10 m |
| WEC Body Thickness | t | ⅓ m |
| WEC Body Thickness | w | 5 m |
| Number of Actuated Geometry Components | n | 5 |
| Component Height | $H_f$ | 2 m |
| Component Width | $w_f$ | 4.5 m |
| Component Thickness | $t_f$ | ⅓ m |
| Side Support Height | $H_s$ | 10 m |
| Side Support Thickness | $t_s$ | ⅓ m |
| Side Support Width | $w_s$ | ¼ m |

Figure 5A:
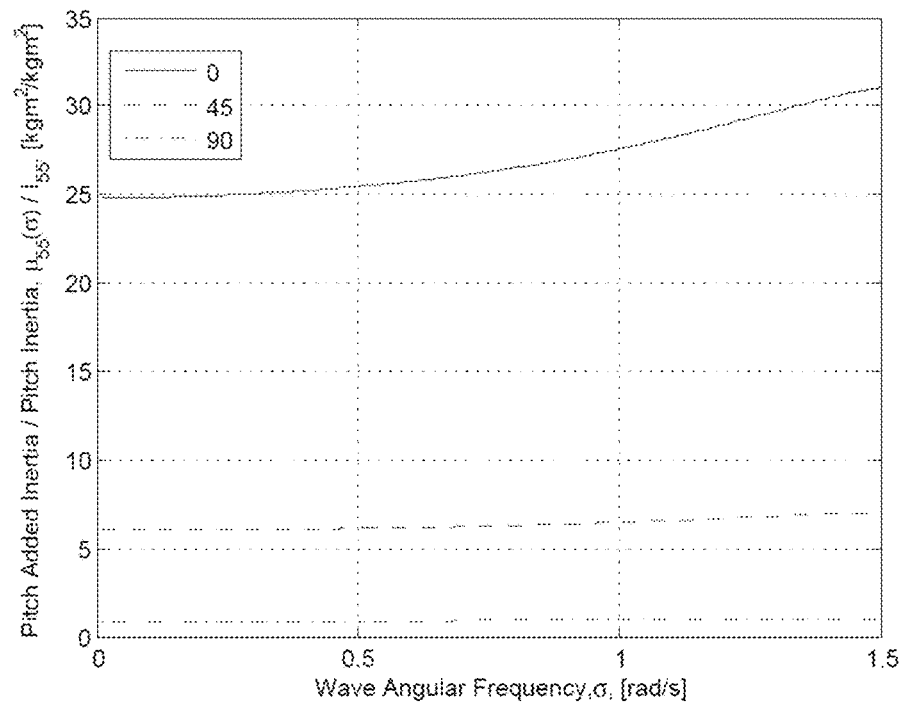
FIGS. 5A-5C are graphical plots illustrating example hydrodynamic coefficients for several pitch angles of the actuated geometry components, in accordance with one or more aspects of the present disclosure.
Figure 5B:
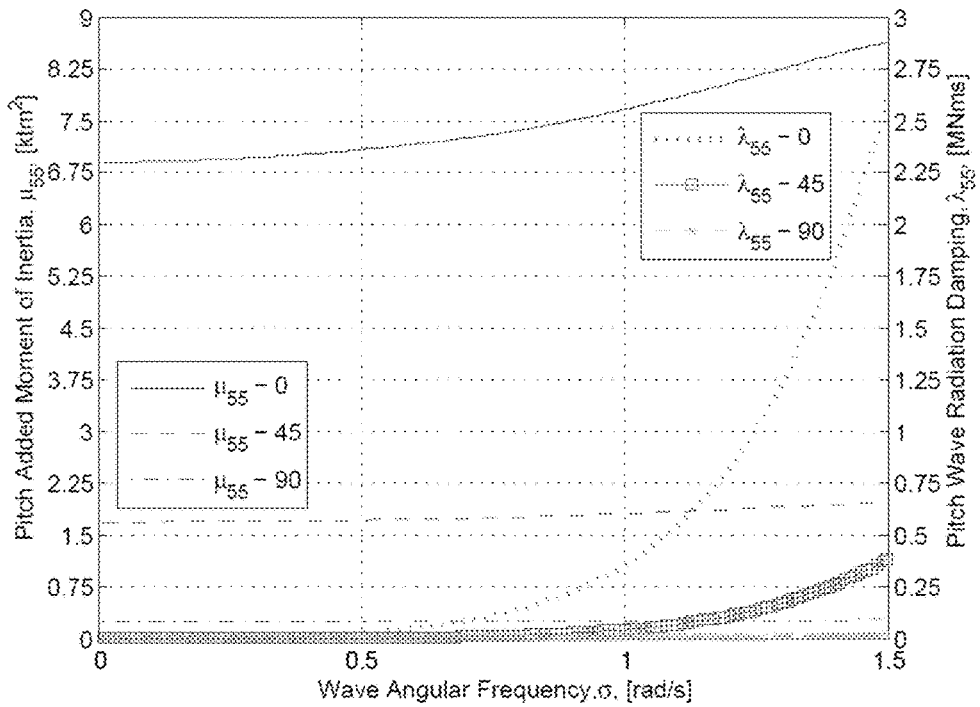
Figure 5C:
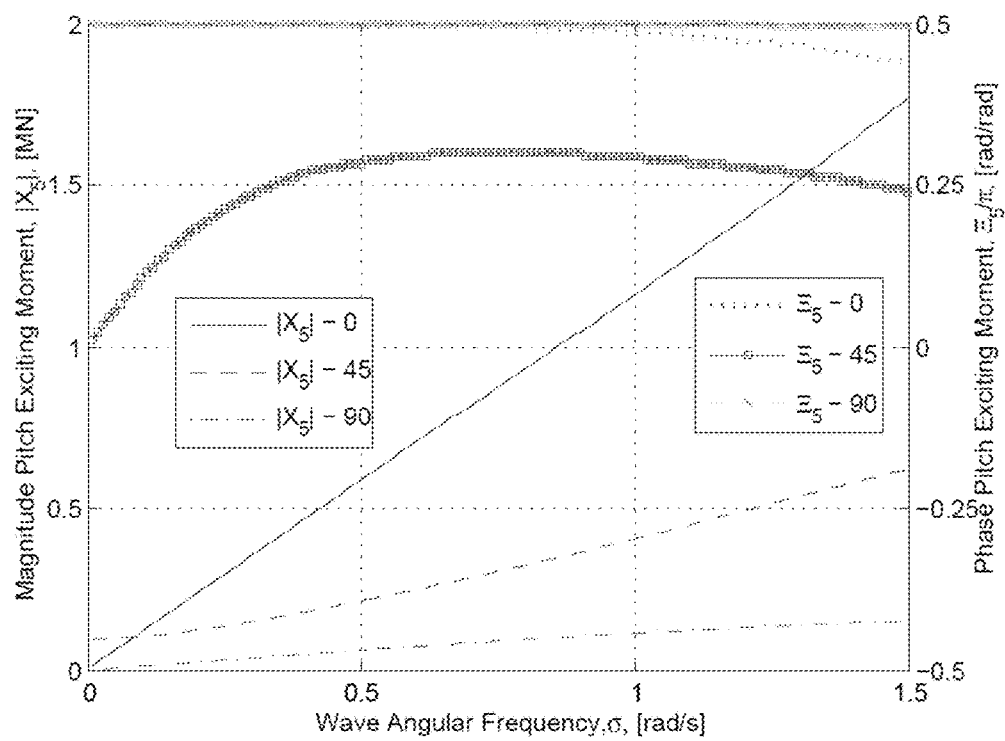

FIGS. 5A-5C are graphical plots illustrating example hydrodynamic coefficients for several pitch angles of the actuated geometry components of WEC system 12, in accordance with one or more aspects of the present disclosure. Specifically, FIG. 5A depicts the ratio of pitch added moment of inertia to pitch mass inertia for three pitch angles (0 degrees, 45 degrees, and 90 degrees), FIG. 5B depicts the pitch added moment of inertia and wave radiation damping for the three pitch angles, and FIG. 5C depicts a magnitude and phase of the wave-exciting force for the three pitch angles. The hydrodynamic coefficients shown in FIGS. 5A-5C were obtained using the WAMIT® software, Version 7.0, produced by WAMIT, Inc. of Chestnut Hill, Mass. As seen in FIGS. 5A-5C, when the pitch angle is set to zero ($\varphi$=0) the added moment of inertia dominates and is 25 times the mass moment of inertia. Pitching the actuated geometry components to 45 degrees drops the added moment of inertia by a factor of 4 and to 90 degrees, by a factor of 25. Since the mass and restoring forces are not affected by foil pitch angle, the resonance period may decrease as the actuated geometry components are opened. The wave-exciting force exhibits a similar trend in magnitude. However, for a pitch angle of 45 degrees, the phase deviates from 0 to 90 degrees as there is a significant contribution from the real component that arises from the difference in the pressure distribution along the x-axis (as shown in FIG. 4B) as the component is pitched.

It is common practice to calculate the response amplitude operator (RAO) to assess the performance of a wave energy conversion system. For an incident wave described by:

$$\eta(x,t) = \Re\left\{-\frac{1}{g}\frac{\partial \phi_I}{\partial t}\bigg|_{z=0}\right\} = \Re\{Ae^{i(\sigma t - kx)}\}, \quad (7)$$

where $\eta$ is the wave elevation, the time-harmonic response of the floating body, in the j-th direction, is given by:

$$\xi_j(t) = \Re\{\bar{\xi}_j e^{i\sigma t}\}, \quad (8)$$

where $\bar{\xi}_j$ is the complex amplitude of motion for the j-th direction. The resulting harmonic motion when allowing for six degrees of freedom can be described by the following coupled system of linear differential equations:

$$\Sigma_{j=1}^{6}[C_{ij} - \sigma^2(I_{ij} + \mu_{ij}) + i\sigma\lambda_{ij}]\bar{\xi}_j = F_i, \quad (9)$$

where $I_{ij}$ is the generalized inertia matrix, $\mu_{ij}$ is the added mass matrix, $\lambda_{ij}$ is the wave damping matrix, $C_{ij}$ is the restoring matrix, and $F_i$ is the complex amplitude of the wave-exciting force.

As seen in FIG. 4B, WEC system 12 will pitch about the origin, O, which is fixed to the seabed. The other five modes of motion will be constrained. The one degree of freedom pitch equation of motion is given by:

$$\frac{\bar{\xi}_5}{A} = \frac{X_5}{[C_{55} - \sigma^2(I_{55} + \mu_{55})] + i\sigma[\lambda_{55} + B_g]}, \quad (10)$$

where $B_g$ denotes the linear power-take-off (PTO) damping coefficient required for power extraction and $X_5$ is the complex wave exciting force per unit wave amplitude ($F_5 = AX_5$). The instantaneous power absorbed by the PTO is calculated from:

$$\frac{P}{A^2} = \frac{B_g}{A^2}\dot{\xi}_5^2 = B_g\sigma^2\left|\frac{\bar{\xi}_5}{A}\right|^2 \cos^2(\sigma t + \Theta), \quad (11)$$

where |.| denotes the magnitude and $\Theta$ is the phase of pitch motion. As the current analysis is in the frequency domain, it is more appropriate to report the time-averaged power (TAP) absorbed by the PTO system which is calculated as follows:

$$\frac{P_{TAP}}{A^2} = \frac{1}{T}\int_0^T B_g\sigma^2\left|\frac{\bar{\xi}_5}{A}\right|^2 \cos^2(\sigma t + \Theta)dt = \frac{1}{2}B_g\sigma^2\left|\frac{\bar{\xi}_5}{A}\right|^2, \quad (12)$$

where T is the wave period. Equation (10) can be inserted into Equation (12), allowing for the optimal PTO damping at each wave frequency to be calculated. This results in the following expression:

$$\frac{B_g(\sigma)}{\lambda_{55}(\sigma)} = \sqrt{1 + \left(\frac{C_{55} - \sigma^2(I_{55} + \mu_{55}(\sigma))}{\sigma\lambda_{55}(\sigma)}\right)^2}, \quad (13)$$

where, at resonance, $B_g = \lambda_{55}$. Equation (13) may not, however, take into account some physical constraints that can arise in various designs. These additional constraints may lead to unrealistic amplitudes of motion in some cases, which could invalidate the linear assumption presented here.

In some examples, a hydrostatic restoring force may be present if the WEC system is positively buoyant (e.g., $\rho\forall > \rho_m\forall$). Such a hydrostatic restoring force is calculated from:

$$f_h(t) = -(\rho\forall r_b - mr_g)g \sin\theta, \quad (14)$$

where $r_g$ is the center of gravity, $r_b$ is the center of buoyancy, and $\forall$ is the displaced volume. The above equation can be linearized by assuming small amplitude motion and approximating $\sin\theta \approx \theta$. For brevity, the mass distribution is assumed uniform, thus $r_g = r_b = H/2$.

Figure 6A:
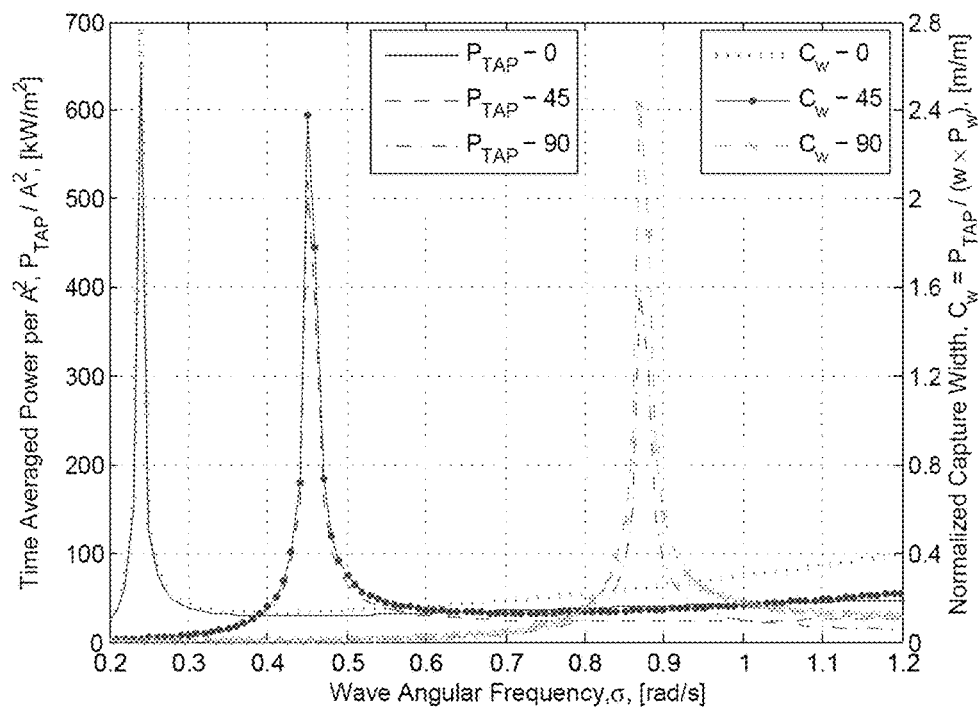
FIGS. 6A-6C are graphical plots illustrating example performance results of the WEC system shown in FIGS. 4A and 4B, without motion constraints, in accordance with one or more aspects of the present disclosure.
Figure 6B:
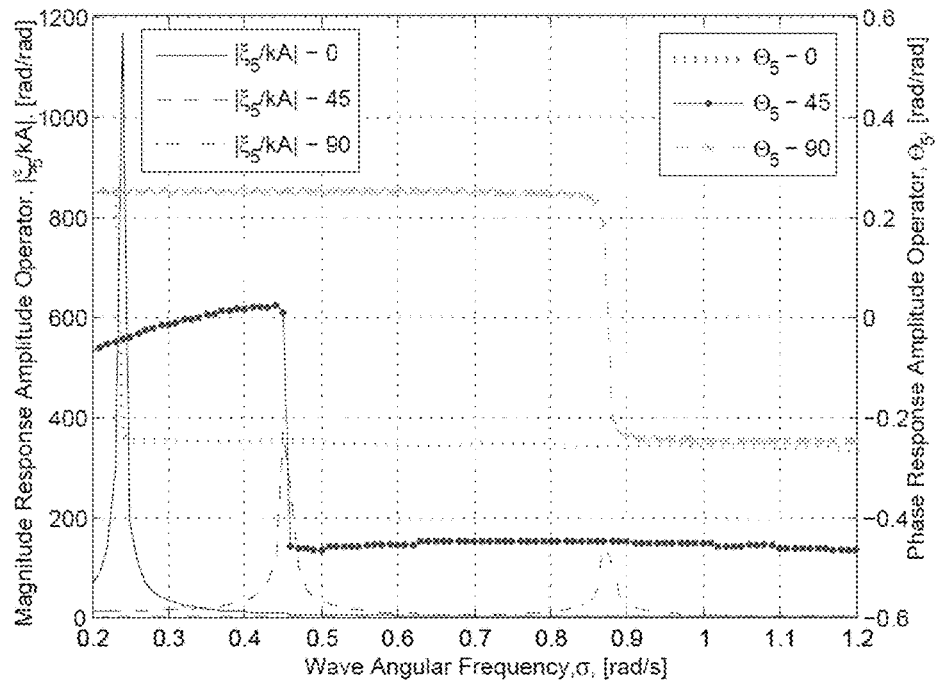
Figure 6C:
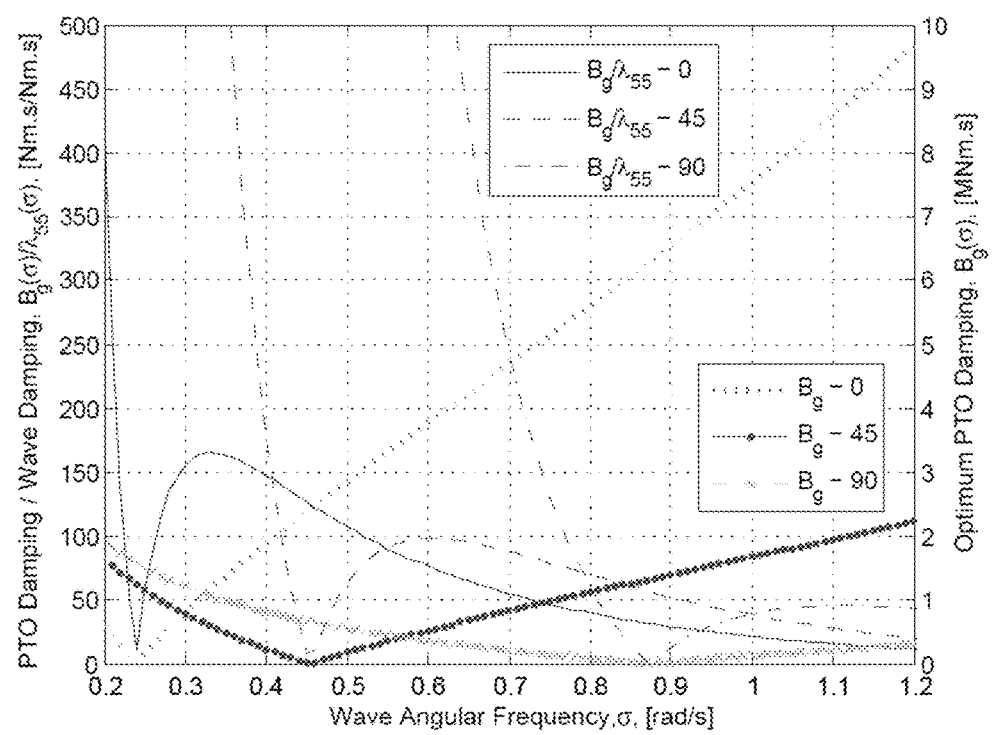

FIGS. 6A-6C are graphical plots illustrating example performance results of WEC system 12, without motion constraints, in accordance with one or more aspects of the present disclosure. Specifically, FIG. 6A depicts the optimum time averaged power and normalized capture width for three pitch angles (0 degrees, 45 degrees, and 90 degrees), FIG. 6B depicts the unconstrained RAO magnitude and phase with the power-take-off damping obtained from Equation (13) for the three pitch angles, and FIG. 6C depicts the unconstrained optimum PTO damping and its ratio with wave damping for the three pitch angles. The amplitude of pitch motion per wave slope is greatest for the closed configuration. As seen in FIGS. 6A-6C, these results include three distinct peaks, which correspond to the shifting resonance frequency as the actuated geometry components of WEC system 12 are opened. However, the frequency of oscillation is significantly reduced, leading to comparable energy production. These results indicate that device performance can be tuned over a wide operating range.

As described herein, the optimal conditions for power absorption may require unconstrained motion and an adequate PTO. However, in practice, physical limitations such as a hydraulic stroke length may constrain a device's maximum amplitude of motion. Furthermore, as seen from FIG. 6C, the optimum performance of the closed flap configuration of WEC system 12 may require a PTO system that can deliver a linear damping coefficient that is nearly 20 times that of the fully open configuration when operating in the high frequency regime. However, both open flap conditions only require a maximum PTO rotational damping of about 2 MNm·s. In order to address these concerns, the PTO damping may be iterated to limit the magnitude of Equation (10) to one with an upper limit of 2 MNm·s.

Figure 7A:
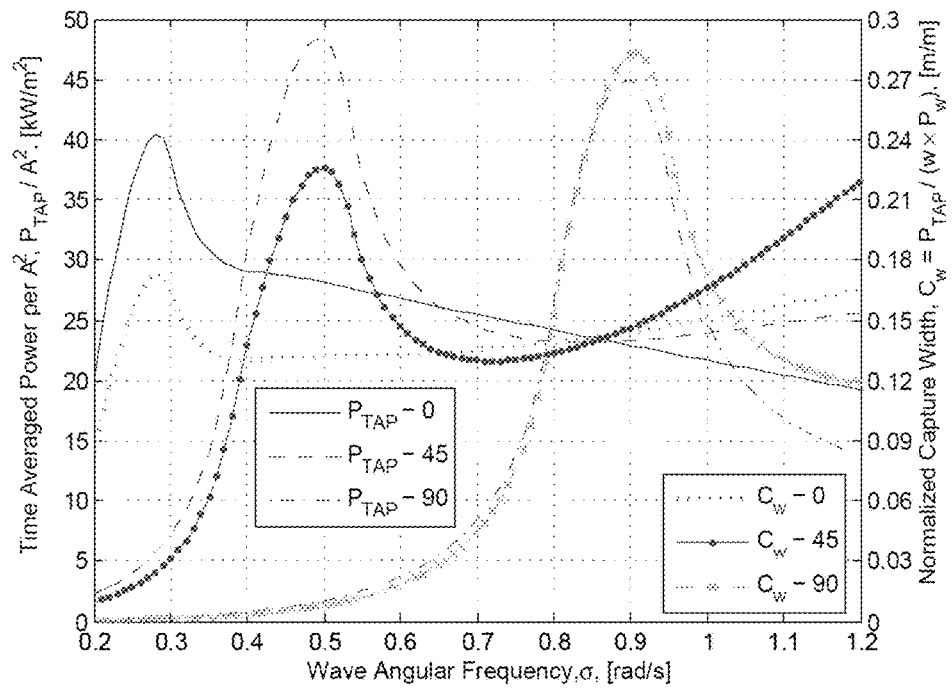
FIGS. 7A-7C are graphical plots illustrating example performance results of the WEC system shown in FIGS. 4A and 4B, with constraints, in accordance with one or more aspects of the present disclosure.
Figure 7B:
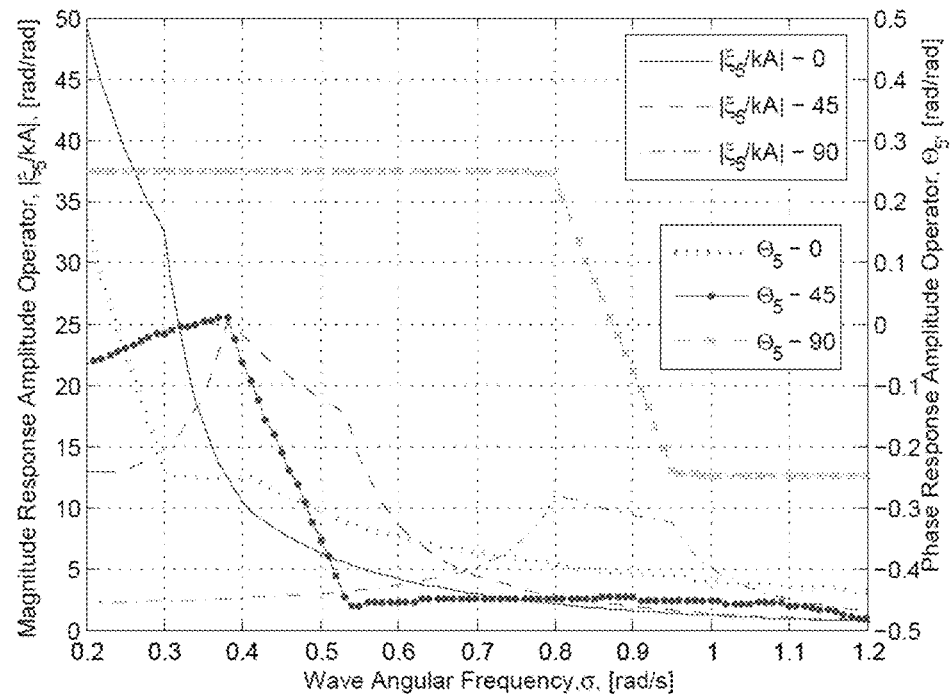
Figure 7C:
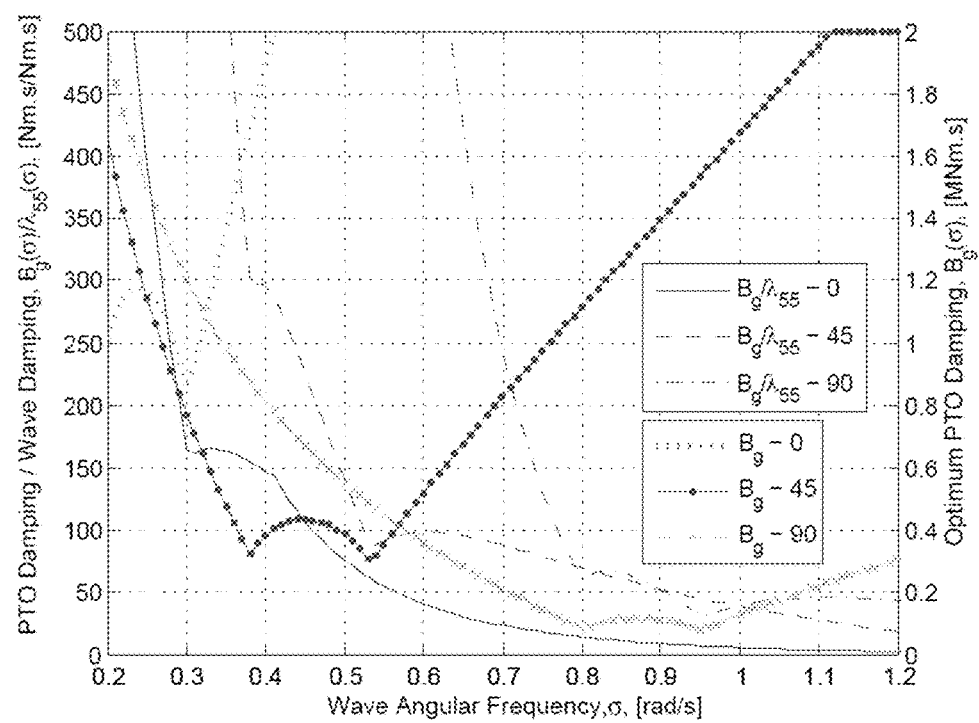

FIGS. 7A-7C are graphical plots illustrating example performance results of WEC system 12 with constraints, in accordance with one or more aspects of the present disclosure. Specifically, FIG. 7A depicts the constrained time averaged power and normalized capture width for three pitch angles (0 degrees, 45 degrees, and 90 degrees), FIG. 7B depicts the constrained RAO magnitude and phase for the three pitch angles, and FIG. 7C depicts the constrained PTO damping and its ratio with wave damping for the three pitch angles. These constraints can cause a dramatic reduction in power production as seen in FIG. 7A, though proper device geometry and PTO configuration can provide 25 kW/m² at minimum over the operating frequency range. The upper limit on the PTO may only affect the fully closed actuated geometry components, providing only a small frequency window where the PTO is not fixed at the upper limit. The PTO damping may also experience a hump about each resonance period due to the motion constraint, as shown in FIG. 7C.

In some examples, the rectangular cross section of the actuated geometry components of WEC system 12 may generate a large amount of vortex shedding (e.g., due to the sharp edges). A more streamlined shape may be used to prevent wave power from being dissipated in eddies, rather than absorbed by the PTO. Modeling of this viscous phenomenon and its effect on power performance is presented later herein.

In accordance with the techniques described herein, some WEC systems may include actuated geometry having rounded rather than rectangular cross sections. For instance, instead of the rectangular cross sections shown in FIGS. 4A and 4B, WEC system 12 may have actuated geometry components with a semi-major axis of about 1 m and a semi-minor axis of about ⅙ m.

Figure 8A:
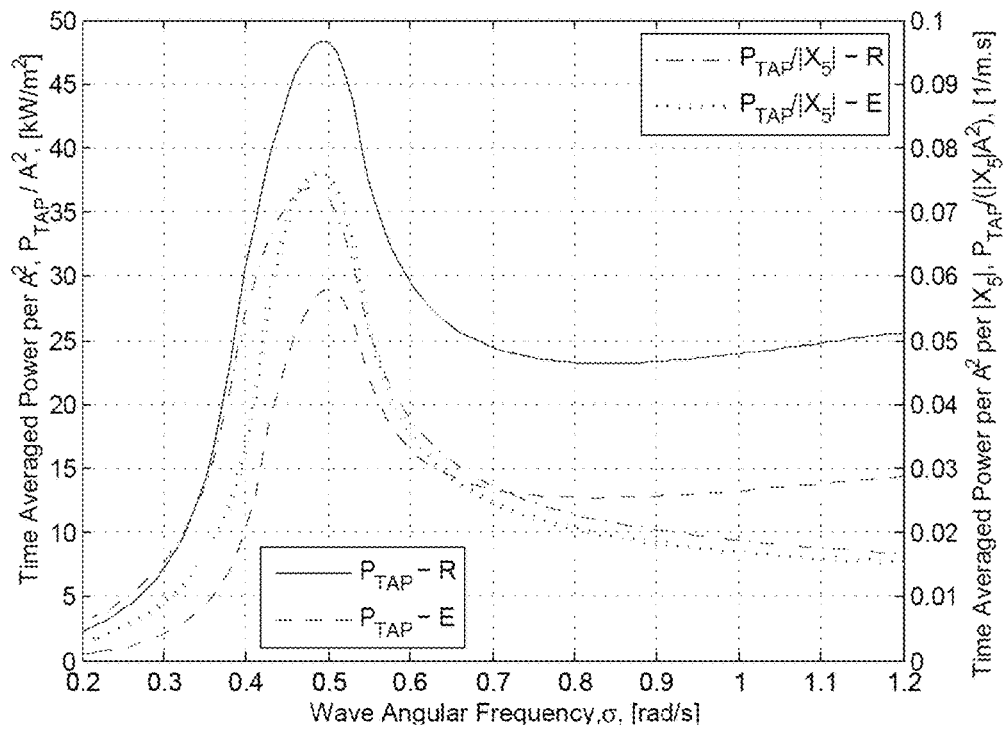
FIGS. 8A-8C are graphical plots illustrating example performance results of the WEC system shown in FIGS. 4A and 4B with rectangular and elliptical actuated geometry components, in accordance with one or more aspects of the present disclosure.
Figure 8B:
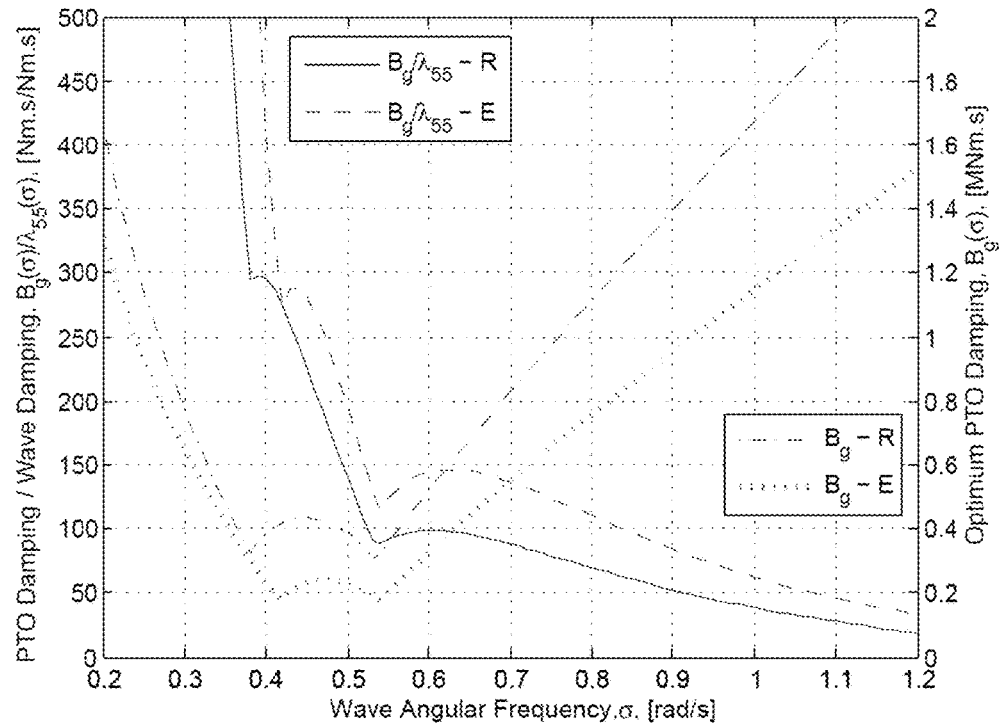
Figure 8C:
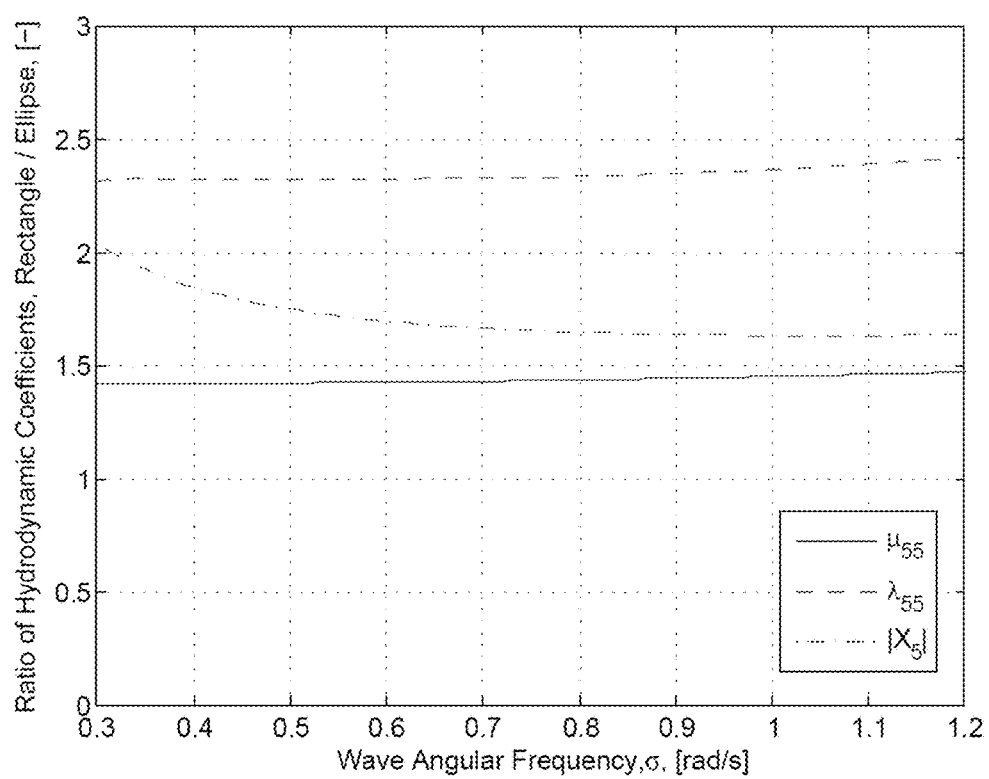

FIGS. 8A-8C are graphical plots illustrating example performance results of WEC system 12 with rectangular and elliptical actuated geometry components, in accordance with one or more aspects of the present disclosure. The same constraints on the RAO and PTO rotational damping were applied. Specifically, FIG. 8A depicts the constrained time averaged power and per wave exciting force amplitude for rectangular and elliptical cross sections, FIG. 8B depicts the constrained PTO damping and its ratio with wave damping for the two cross sections, and FIG. 8C depicts the ratio of hydrodynamic coefficients for the two cross sections. The change in cross section from rectangular to elliptical may lead to a decrease in the flap displaced volume by approximately 20 percent. The most significant result from the comparison is the nearly 40 percent drop in time averaged absorbed power, as shown in FIG. 8A. However, to account for the decrease in displaced volume, the TAP was divided by the amplitude of the wave exciting force, providing comparable results. As previously discussed, the change in cross section decreased the wave damping by over 50 percent, increased moment of inertia by 33 percent, and increased the wave-exciting force magnitude by 40 percent.

In some examples, actuated geometry components may be actuated in synchronization. In some examples, however, a simpler control of the actuated geometry components may include moving the components independently. This may allow for configurations where some components (e.g., the top flap or top two flaps of WEC system 12) are pitched to 90 degrees while others are not. It would not be unexpected to see five resonance peaks accounting for each additional component opened. Simple individual control may allow the device performance to be maximized over the range of about 7-16 s wave periods, where an average value of about 40 kW/m² is obtainable. Furthermore, as the actuated geometry components are opened, the structural loading on the device is reduced, which may allow for loading constraints to be maintained. In addition, various wave prediction methodologies may be used to reduce peak loads.

The results of modeling the different component cross sections also suggest that the fifth (bottom) component of WEC system 12 may have little influence on the device performance. That is, there is only a small range where greater power is absorbed when compared to the 4-component configuration. However, the addition of the fifth component does provide a significant reduction in hydrodynamic loading. As a result, in some example embodiments, some actuated geometry components may be fixed under normal operation. Furthermore, in extreme sea conditions, some actuated geometry components can be feathered to reduce loading. However, it may be beneficial in some examples to permanently fix one or more of the actuated geometry components, in order to add structural rigidity and eliminate additional rotational actuators thereby reducing the overall system complexity.

The inviscid assumption (e.g., ignoring viscous effects) used so far may, in some instances, lead to over prediction of the motion and absorbed power of the devices and systems described herein. Modeling the viscous drag moment (e.g., of WEC system 12) may improve accuracy. This modeling begins with Morison's equation:

$$f_d(t) = -\tfrac{1}{2}\rho C_D(r,\varphi) A_p(r,\varphi) r \dot{\theta}(t) |r \dot{\theta}(t)|, \tag{15}$$

where $f_d$ is the drag force and $C_D$ is the drag coefficient, which is a function of pitch angle and potentially of the radial position. $A_p$ is the projected area of the actuated geometry component normal to the rotational velocity of the WEC system, |.| denotes the absolute value, and r denotes the position of the drag element along the radial axis. The moment generated by taking a differential slice of the WEC along the xy-plane is given by:

$$dM_d(t,\varphi) = -\tfrac{1}{2}\rho C_D w \dot{\theta}(t) |\dot{\theta}(t)| r^3 dr \tag{16}$$

where $M_D$ is the drag induced moment and dr is the differential unit along the radial axis. In order to obtain the total drag moment, the above equation must be integrated over the height of WEC system 12:

$$M_d(t,\varphi) = -\tfrac{1}{2}\rho C_D w \dot{\theta}(t) |\dot{\theta}(t)| \int_0^H r^3 dr. \tag{17}$$

Equation (17) can be integrated directly if the actuated geometry components are closed. However, as the components are pitched, the projected area will need to be adjusted. The change in projected area with component pitch angle can be modeled as:

$$A_p(\varphi) = 2w_f(a|\cos \varphi| + b|\sin \varphi|), \tag{18}$$

with the bounds of integration in Equation (17) set to:

$$r = r_{ci} \pm (a|\cos \varphi| + b|\sin \varphi|), \tag{19}$$

where $r_{ci}$ is the radial position of the center of rotation of the i-th component. The total drag moment is the summation over the total number of actuated geometry components:

$$M_d(t, \varphi) = -\sum_{i=1}^{N} M_{di}, \tag{20}$$

$$M_{di} = \tfrac{1}{8}\rho w_f C_D(\varphi)\theta(t)|\theta(t)|r^4 \Big|_{r_{ci}-(a|\cos\varphi|+b|\sin\varphi|)}^{r_{ci}+(a|\cos\varphi|+b|\sin\varphi|)}. \tag{21}$$

The drag coefficient may be assumed to be constant over the actuated geometry component. An appropriate choice of $C_D(\varphi)$ as the projected area is reduced by a factor of up to ⅙ may be an important consideration for accurate modelling.

The viscous drag may be addressed in various example systems and devices, in order to avoid a reduction in the power capture efficiency (e.g., by up to 60 percent for the largest wave amplitude). The ratio of the velocity magnitude over the wave slope may be nearly equivalent between the four geometries. The absorbed power has local maximums for each configuration. However, a 2-component configuration may be the most robust over the frequency range.

In some examples, the rotational velocity from Equation (17) may be subtracted by the undisturbed fluid orbital velocity. A non-linear time domain model can be constructed to ascertain the effect of the modelling approximation. The results of such a model show only minor differences, however.

A frequency domain analysis cannot be used to model non-linear systems. However, by linearizing the non-linear terms, a spectral analysis in the frequency domain may also be used to estimate the performance of devices and systems as described herein.

For sinusoidal waves that may be experienced in some examples, the torque generated by the non-linear drag term may be substituted with a linear term using the Lorentz linearization. This method consists of ensuring the work done over one wave cycle is the same for both linear and non-linear expressions and can be represented by:

$$\langle (\Lambda \dot{\theta}^2) \rangle = \langle \Lambda_{nl} |\dot{\theta}| \dot{\theta}^2 \rangle, \tag{22}$$

where $\langle . \rangle$ stands for the average over one wave cycle, $\Lambda$ is the linearized viscous damping coefficient, and $\Lambda_{nl}$ is the non-linear viscous damping coefficient. The result from integrating both terms in Equation (22) over one wave cycle provides the following expression for the linearized damping coefficient:

$$\Lambda = \frac{8|\xi_5|\sigma}{3\pi} \Lambda_{nl}. \tag{23}$$

The linearized viscous damping coefficient can now be inserted into Equation (10), leading to:

$$\frac{\xi_5}{A} = \frac{X_5}{[C_{55} - \sigma^2(I_{55} + \mu_{55})] + i\sigma\left[\lambda_{55} + B_g + \frac{8|\xi_5|\sigma\Lambda_{nl}}{3\pi}\right]}. \tag{24}$$

A result of the substitution is the presence of the device amplitude of motion on both sides of the equation. An iterative-zero solver may be used, but the response is no longer invariant to the incoming wave amplitude. It is possible to combine Equations (12) and (24), with slight modifications, to form a constrained non-linear optimization problem. The problem can be solved, for example, using the function fmincon in the MATLAB® software produced by MathWorks of Natick, Mass.

Figure 9A:
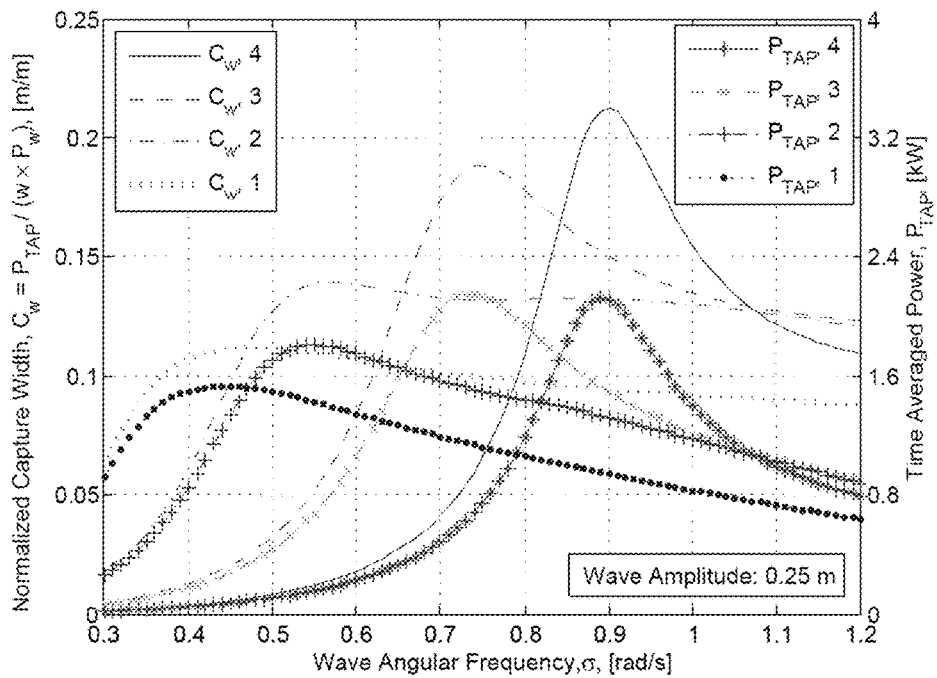
FIGS. 9A-9F are graphical plots illustrating a sample set of results from solving the non-linear problem, comparing wave amplitudes of 0.25 and 2 m, in accordance with one or more aspects of the present disclosure.
Figure 9B:
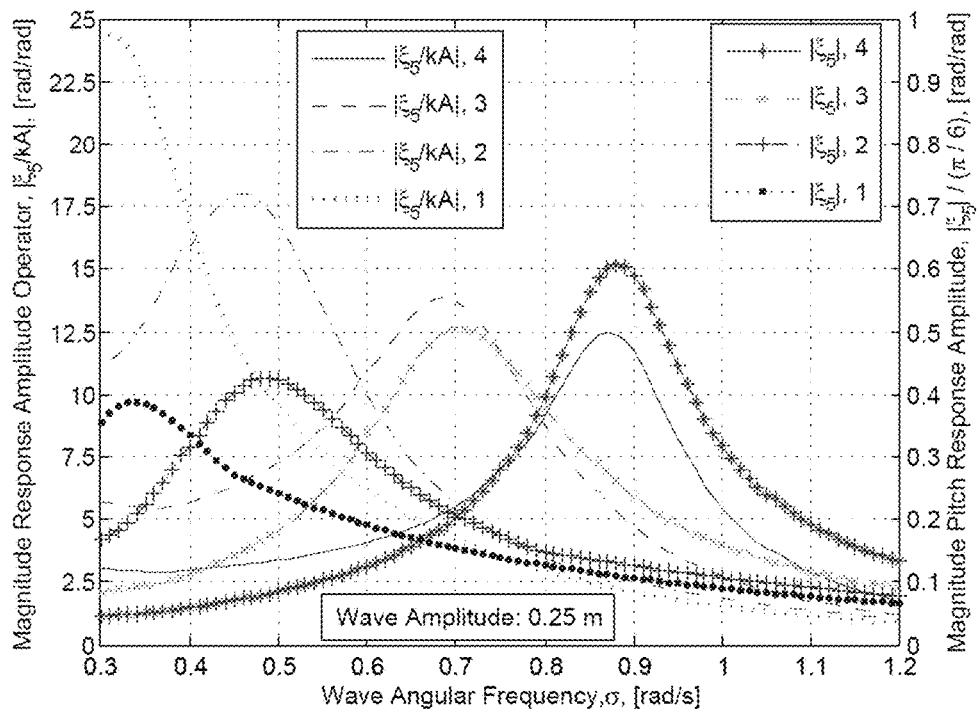
Figure 9C:
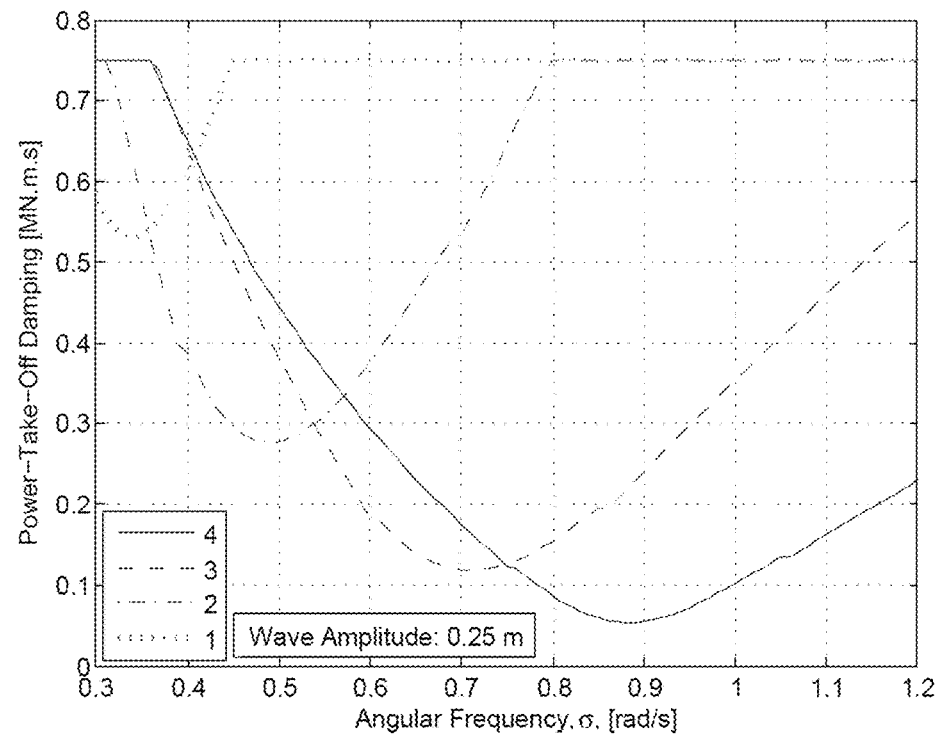
Figure 9D:
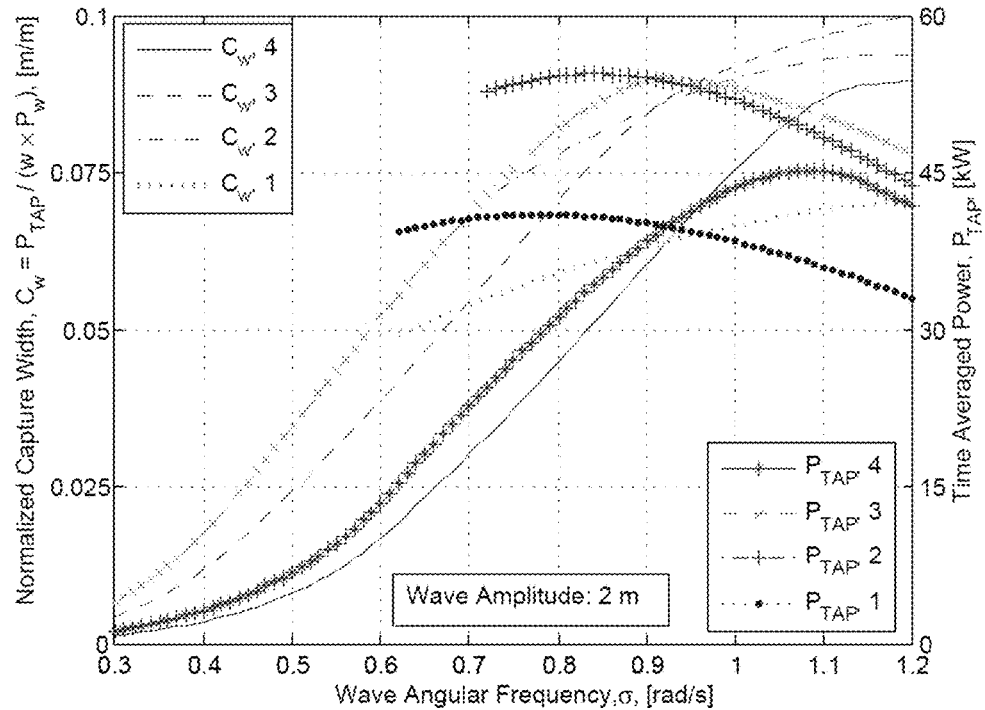
Figure 9E:
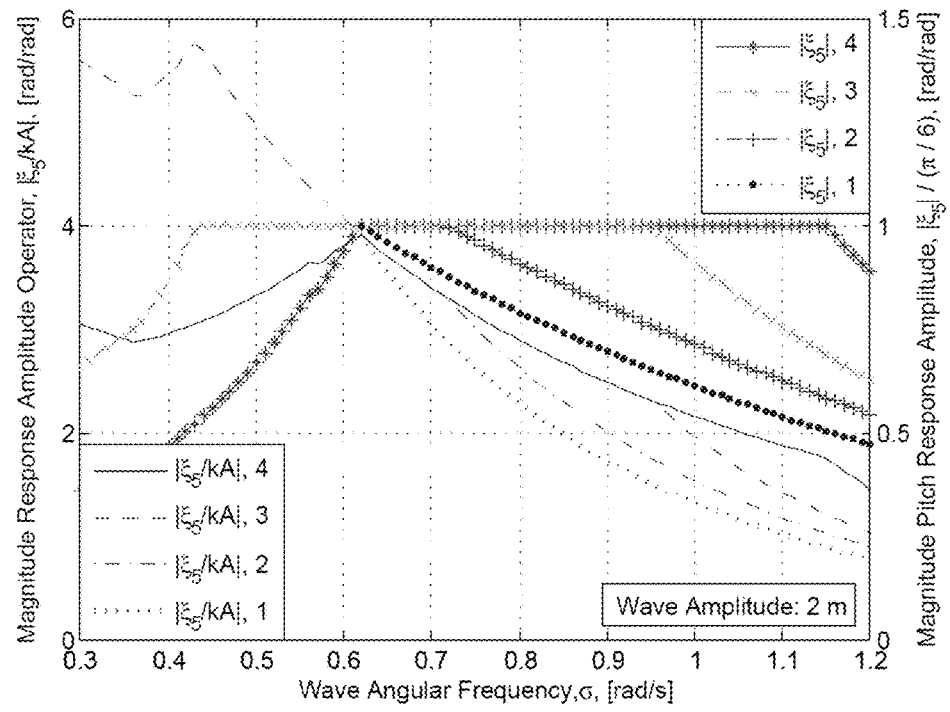
Figure 9F:
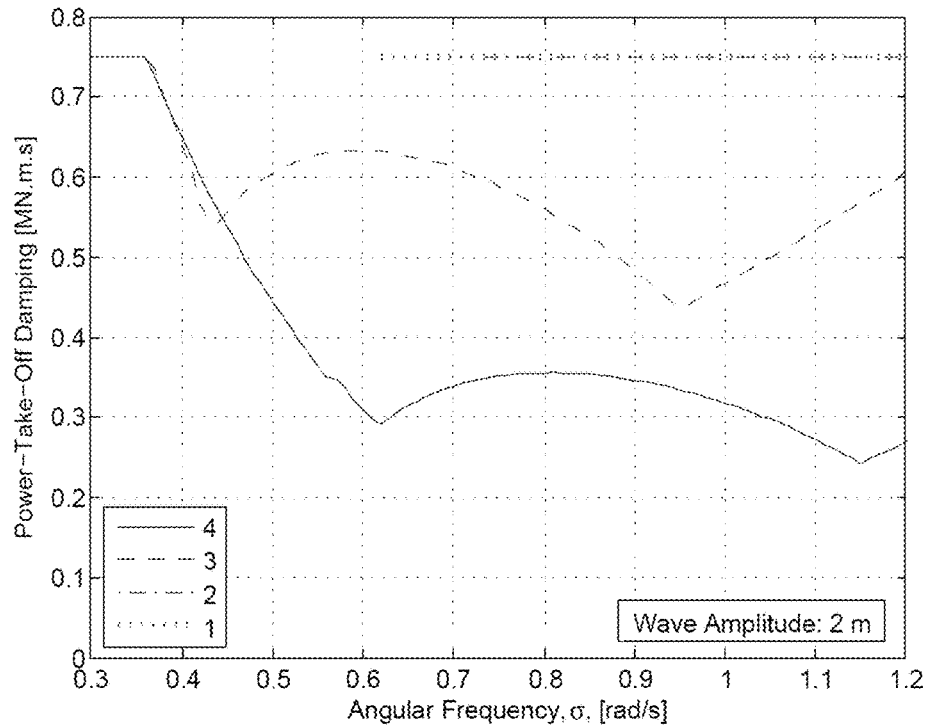

FIGS. 9A-9F are graphical plots illustrating a sample set of results from solving the non-linear problem, comparing wave amplitudes of 0.25 and 2 m, in accordance with one or more aspects of the present disclosure. Specifically, FIGS. 9A and 9D depict the constrained of time averaged power and normalized capture width for four actuated geometry component configurations using the non-linear optimizer with A=0.25 m and A=2 m respectively. FIGS. 9B and 9E depict the constrained RAO magnitude and pitch amplitude for the four configurations using the non-linear optimizer with A=0.25 m and A=2 m, respectively. FIGS. 9C and 9F depict the constrained optimum PTO damping for the four configurations using the non-linear optimizer with A=0.25 m and A=2 m, respectively.

For the modeling of FIGS. 9A-9F, a maximum pitch amplitude of 30 degrees was set and the PTO damping was limited to 0.75 MNm·s. As shown in FIG. 9A, the power capture efficiency may be the greatest, since the incoming wave amplitude is too low to reach the imposed motion constraints and thus the body is allowed to oscillate freely. In this regime the actuation of the actuated geometry components may be desired in order to maximize power absorption. The response of the four different component configurations can be seen in FIG. 9B, where the typical resonant motion is still observed with the four-component configuration. The optimum PTO damping, shown in FIG. 9C, evidences a minimum at each resonant frequency. However, due to the presence of the viscous damping contribution it does not equal the wave damping.

FIGS. 9D-9F correspond to the wave amplitude being increased to 2 m. As shown in FIG. 9D, for certain configurations and wave conditions, solutions are not plotted. FIG. 9E shows both the three- and four-component configurations approaching the upper limit on pitch motion. As seen in FIG. 9F, the damping magnitude for both the three- and four-component configurations may be large enough to control the device. However, for the other configurations, the PTO damping may be unsuccessful at reducing the motion amplitude below 30 degrees. As such, in some examples, the 3 flap configuration may be better suited to remain in operation while still optimizing power absorption. In this regime the actuated geometry components are successful at shedding hydrodynamic loading.

The techniques of the present disclosure provide improved systems and devices for wave energy conversion by combining a WEC with active control surfaces referred to herein as actuated geometry. The control surfaces or actuated geometry may be similar to air foils that have the ability to alter the geometry normal to the particle velocity of waves. These control surfaces may thus be useable to reduce hydrodynamic loading while allowing for operation in a larger range of sea states. The devices and systems have also been shown to be effective at tuning the hydrodynamic characteristics to match the sea conditions allowing for optimum power extraction.

For example purposes only, the analysis presented herein has focused on regular waves, while assuming the PTO provides a constant and continuous damping coefficient. However, active control of the power-take-off system may additionally or alternatively be used to further optimize power absorption.

The techniques described herein were evaluated using traditional linear frequency domain techniques. The performance sensitivity to actuated geometry component pitch angle, component cross section, and number of activated components have been considered and addressed. The present disclosure further elaborates by introducing nonlinear hydrodynamics—for example, viscous drag forces. A non-linear time-domain model was used to examine how performance varied with wave height. The viscous drag contribution was then linearized using the Lorentz theorem allowing for the construction of a nonlinear optimization problem that incorporated motion and power-take-off constraints. The result of which highlighted the ability of some systems configured in accordance with the techniques described herein to adapt to various wave climates, specifically how some of the designs may be effective at reducing hydrodynamic loading for continued operation.

Figure 10:
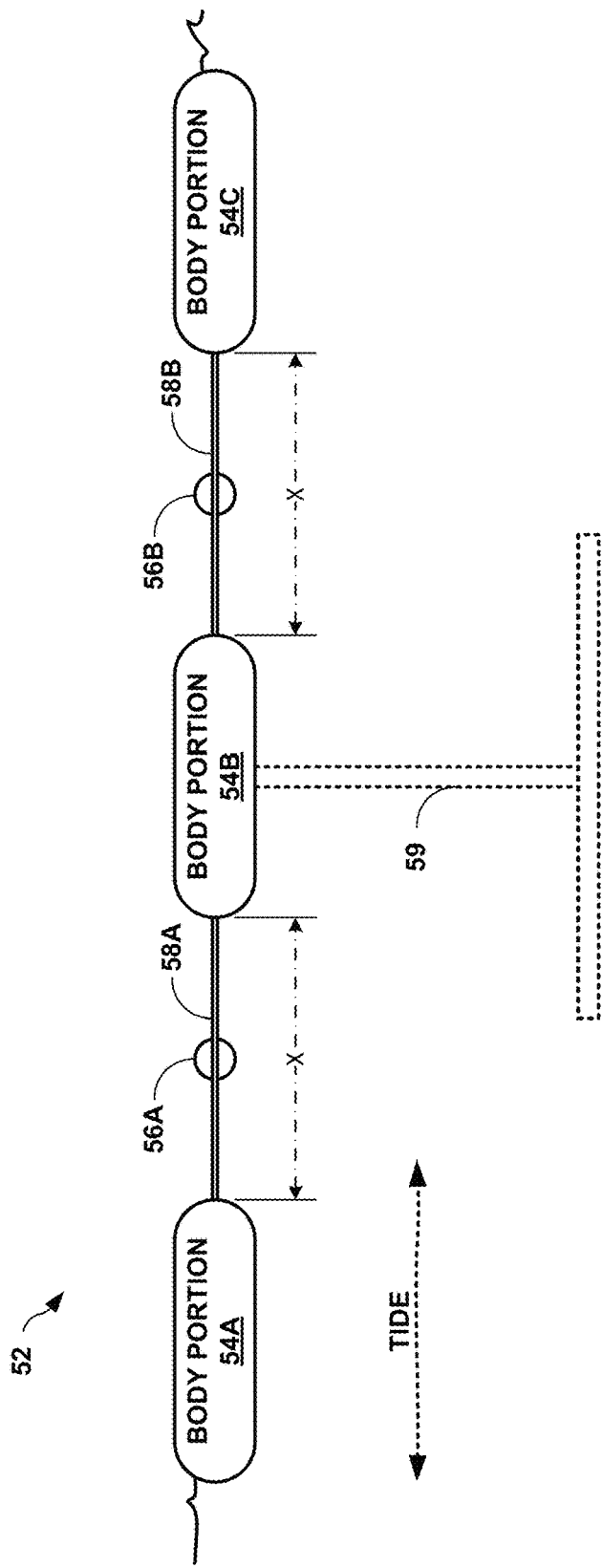
FIG. 10 is a conceptual diagram illustrating an example WEC system, in accordance with one or more aspects of the present disclosure.

FIG. 10 is a conceptual diagram illustrating an example WEC system (e.g., WEC system 52), in accordance with one or more aspects of the present disclosure. FIG. 10 is not to scale. WEC system 52 represents one example of an oscillating pitch WEC system that incorporates actuated geometry as described herein. That is, WEC system 52 may use pitching motion to store and/or convert wave energy. As shown in the example of FIG. 10, WEC system 52 includes body portions 54A-54C (collectively "body portions 54"), PTO devices 56A and 56B (collectively "PTO devices 56"), and actuated geometry components 58A and 58B (collectively "actuated geometry components 58"). Optionally, WEC system 52 may include structural support 59 in some examples.

In the example of FIG. 10, body portions 54 are floating structures that absorb wave energy and turn it into kinetic energy. Body portions 54 may be formed in any suitable shape, and of any suitable material. For instance, body portions 54 may be spheres made of a plastic, cylindrical metal drums, or any other shape. Body portions 54 may be solid, or hollow. In some examples, body portions 54 may be filled with air, with foam, or with any other material useful to provide buoyancy. While shown in FIG. 10 as including only 3 body portions, WEC system 52 may, in other examples, include more or fewer body portions. For instance, WEC system 52 may include a two dimensional grid of body portions, interconnected by actuated geometry components. Body portions 54 may float upon the water surface, moving up and down in approximately a vertical direction as tides (e.g., waves) flow left and right.

PTO devices 56 may store and/or convert the kinetic energy of body portions 54 (e.g., into electrical energy or another energy form). In the example of FIG. 10, PTO devices 56 are connected to actuated geometry components 58 which are disposed between body portions 54. In some examples, PTO devices 56 may be rotational power systems that store or convert energy when they are rotated. As waves pass WEC system 52, body portions 54 may rise or fall unequally, causing actuated geometry components 58 to be at an angle. As a result, PTO devices 56 may rotate and store or convert this angular kinetic energy.

Actuated geometry components 58, in the example of FIG. 10, include rigid or semi-rigid connections that connect body portions 54 to one another. In some examples, actuated geometry components 58 may also include means for lengthening or shortening the length of the connections. For instance, actuated geometry components 58 may include one or more motors, hydraulic pistons, springs, cranks, or other means. In some examples, the motor or means may be situated within at least one of body portions 54. Actuated geometry components 58 may be operable to modify the length of the connections between body portions 54, in order to increase or decrease the distance between body portions 54 (shown as variable X in FIG. 10). That is, the motor or other means may be used to extend or retract the connectors in order to increase or decrease the distance between body portions 54.

For systems similar to WEC system 54, maximizing the energy extraction may entail matching the natural frequency of oscillation about PTO devices 56 to oncoming wave frequency. One or more of the mass, added mass, hydrostatic stiffness, PTO device stiffness and damping, and positions of the centers of gravity (cg) with respect to the PTO devices may all be factors in determining the natural frequency and mode shapes of such systems. The techniques described herein uses variable length connecting arms between PTO devices 56 and body portions 54 to control the natural frequency—matching the oncoming wave frequency as it changes. Furthermore, actuated geometry components 58 may be operated to reduce structural loads. As one example, actuated geometry components 58 may extend the distance between body portions 54 when the wave amplitude is above a threshold, in order to ensure that PTO devices 56 are not overstrained.

Figure 11:
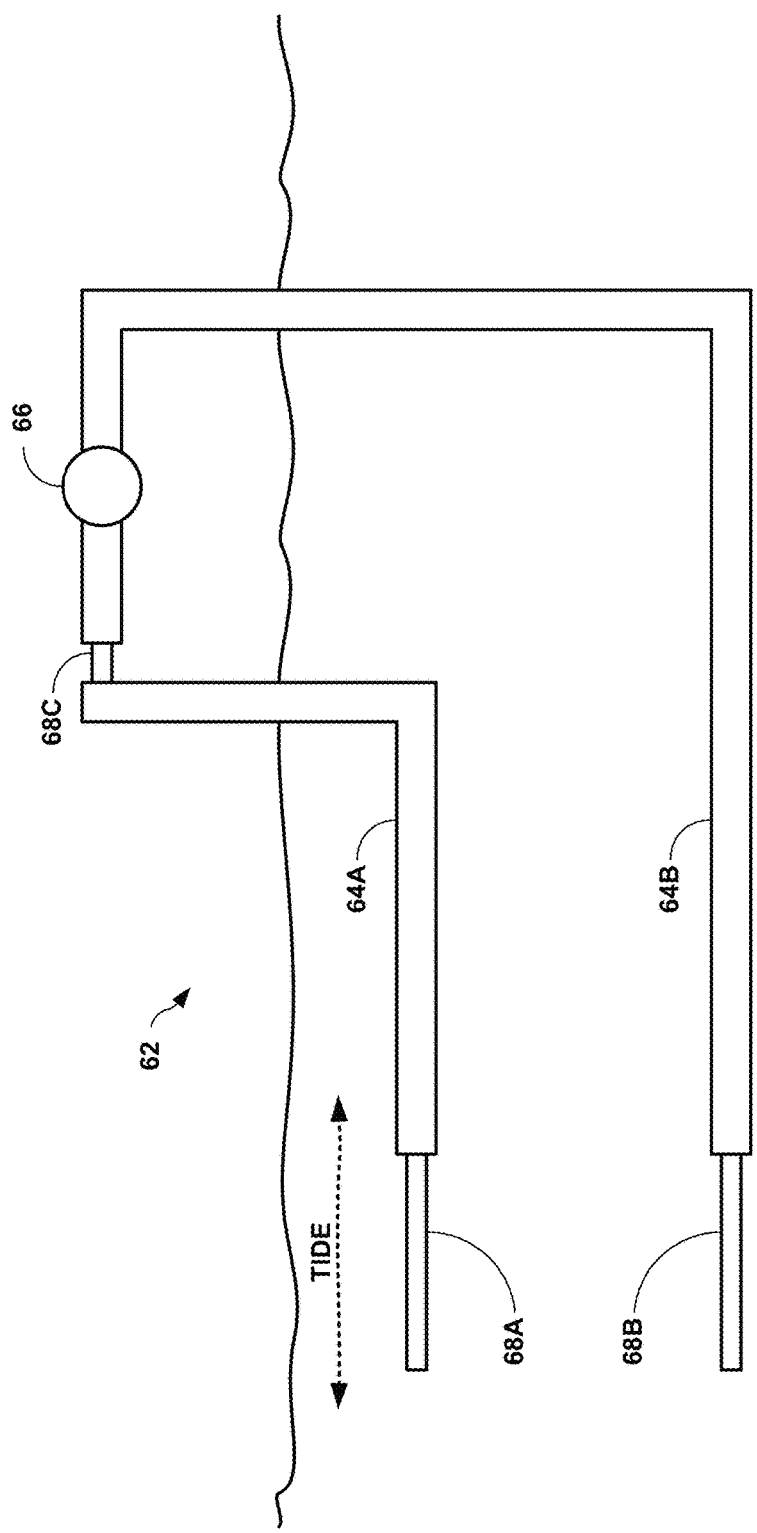
FIG. 11 is a conceptual diagram illustrating an example WEC system, in accordance with one or more aspects of the present disclosure.

FIG. 11 is a conceptual diagram illustrating an example WEC system (e.g., WEC system 62), in accordance with one or more aspects of the present disclosure. FIG. 11 illustrates a cross section of WEC system 62, and is not to scale. WEC system 62 represents one example of an oscillating water column-type WEC system that incorporates actuated geometry as described herein. As shown in FIG. 11, WEC system 62 includes body portions 64A and 64B (collectively "body portions 64"), PTO device 66, and actuated geometry components 68A-68C (collectively "actuated geometry components 68").

In the example of FIG. 11, body portions 64 form a tube-like structure. The tube-like structure has a first end (e.g., at which actuated geometry components 68A and 68B are located) and a second end (e.g., at which PTO device 66 and actuated geometry component 68C are located). As shown in FIG. 11, the first end of the tube-like structure formed by body portions 64 is substantially open while the second end of the tube-like structure is substantially closed. That is, matter is allowed to enter and exit the first end of the tube-like structure relatively freely while the second end is almost entirely sealed. In the example of FIG. 11, the second end of the tube-like structure formed by body portions 64 sits above the surface of the water, and thus the tube-like structure has an air pocket.

Body portions 64, in the example of FIG. 11, may be formed of plastic, metal, cement, or any other suitable material. Body portions 64 may be built sufficiently sturdy to withstand the variations in normal sea conditions. In some examples, one or more of body portions 64 may be permanently tethered or anchored in place. In other examples, body portions 64 may be moored and more mobile.

In the example of FIG. 11, PTO device 66 may store and/or convert energy from the force exerted by water and/or air within body portions 54. For instance, PTO device 66 may be a turbine generator or air compressor. While shown as including only a single PTO device 66 in the example of FIG. 11, WEC system 62 may, in other examples, include two or more PTO devices.

Actuated geometry components 68, in the example of FIG. 11, each include an extension piece, capable of extending certain ones of body portions 64. In some examples, actuated geometry components 68 may also include means for extending and/or retracting the respective extension piece. For instance, actuated geometry components 68 may include an electric motor, a hydraulic piston, a spring, a crank, or any other suitable means for extending and/or retracting the respective extension piece.

Actuated geometry components 68 may be made of any suitable materials and structures. For example, actuated geometry components 68 may be plastic walls that, when retracted, are stored within body portions 64. When extended, the plastic walls may protrude from body portions 64, effectively extending body portions 64 themselves. As another example, actuated geometry components 68 may be accordion-like structures that collapse when retracted and expand when extended. Actuated geometry components 68 may be operated to modify the geometry of body portions 64. For instance, actuated geometry components 68 may be operated to modify a length of the tube-like structure created by body portions 64, a cross-sectional area of at least a portion of the tube-like structure, and/or a cross-sectional shape of at least a portion of the tube-like structure.

In the example of FIG. 11, the tube-like structure of WEC system 62 may contain an internal water column (sometimes referred to as a "slug" of water). The water column may be driven by tides (e.g., water surging with waves, from left to right and/or right to left in FIG. 11). As the water column moves, fluid (e.g., air) may be driven through PTO device 66. In some examples, PTO device 62 may use the fluid motion to turn a generator and produce power.

To optimize power capture of systems such as WEC system 62, the natural frequency of resonance of the water column in the device should closely match the frequency of the oncoming waves. The natural frequency of such systems may depend on the mass of the water column and the internal free surface area. The natural frequency may also influenced by the size of any internal compressible fluid pocket.

Actuated geometry components 68 may be used to change the geometry of WEC system 62 in order to control the mass of the water column, change the internal free surface area, and/or change the size of the internal compressible fluid pocket. For instance, actuated geometry components 68A and/or 68B may be operated to modify a length of the tube-like structure at the first end, thereby controlling the mass of the water column within and/or changing the internal free surface area. As another example, actuated geometry component 68C may be operated to modify the cross-sectional volume of the tube-like structure at the second end, thereby increasing the volume of compressible fluid in the pocket contained within the tube-like structure. In some examples, actuated geometry component 68C may be a flexible, inflatable material that may essentially form a bulb at or near the second end of the tube-like structure, in order to increase or decrease a volume of fluid (e.g., air or water) within the tube-like structure.

Figure 12:
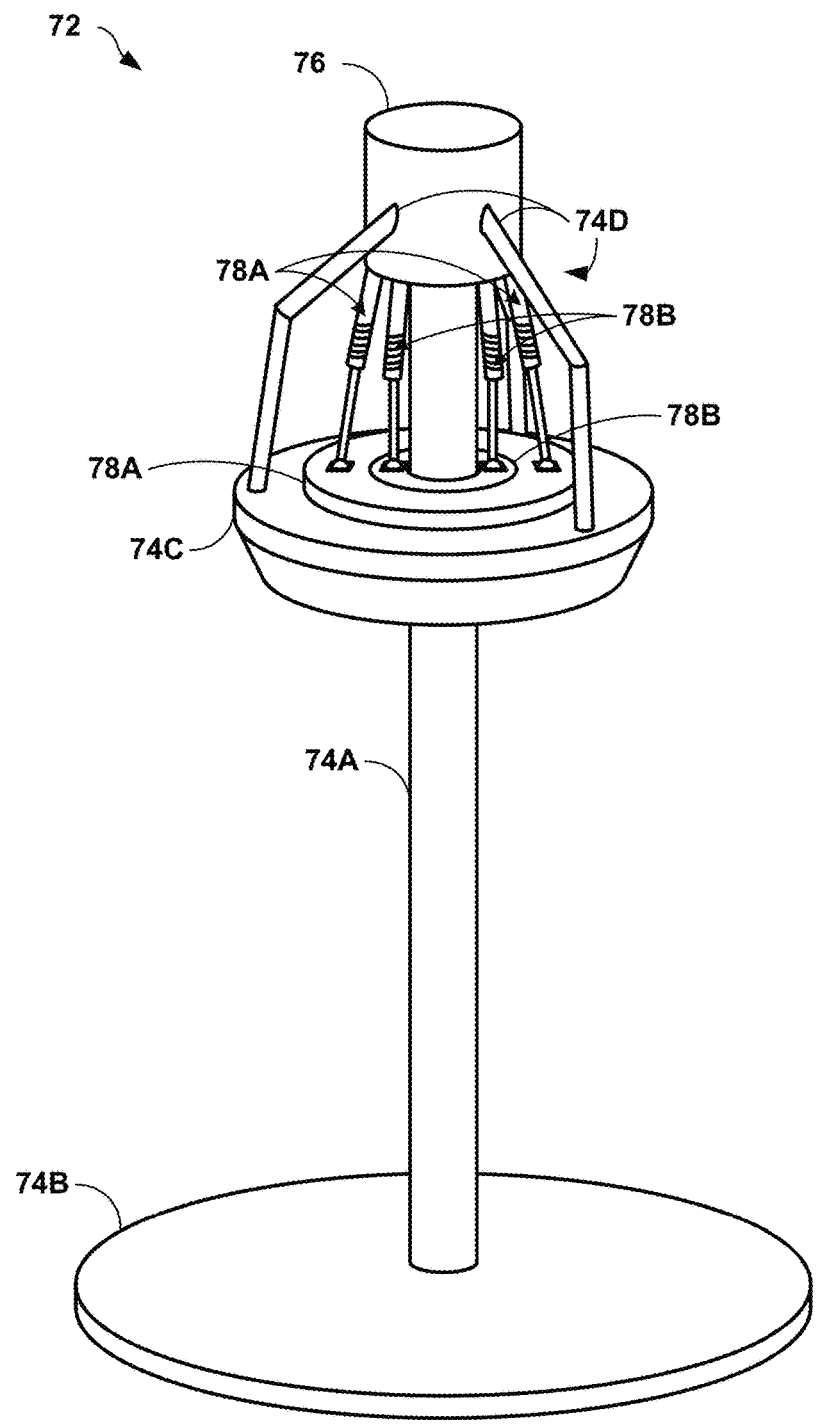
FIG. 12 is a conceptual diagram illustrating an example WEC system, in accordance with one or more aspects of the present disclosure.

FIG. 12 is a conceptual diagram illustrating an example WEC system (e.g., WEC system 72), in accordance with one or more aspects of the present disclosure. FIG. 12 is not to scale. WEC system 72 represents one example of a point absorber WEC system that incorporates actuated geometry as described herein. In the example of FIG. 12, WEC system 72 includes body portions 74A-74D (collectively "body portions 74"), PTO device 76, and actuated geometry components 78A and 78B (collectively "actuated geometry components 78").

In the example of FIG. 12, body portions 74A, 74B, 74C, and 74D are a vertical spar, a bottom plate, a fixed float, and support struts, respectively. Body portion 74A may provide a column along which body portions 74C and 74D (and PTO device 76) may be allowed to move. That is, body portions 74C and 74D may not be attached to body portion 74A.

Body portions 74 may be made of any suitable materials, such as metal, composite, plastic, or others. In some examples, the bottom plate (e.g., body portion 74B) may rest on or be attached to the sea floor. In other examples, the bottom plate may hang below the surface, but above the sea floor. That is, in some examples body portion 74B may act as a weight exerting a downward force on WEC system 72. The fixed float (e.g., body portion 74C) may include some form of buoyant material, such as foam, air, or other material.

PTO device 76, in the example of FIG. 12, stores and/or converts energy from the relative movement between body portion 74A and body portions 74C and 74D. PTO device 76 may, for example, be a turbine generator, an air compressor or air pump, or other apparatus configured to store and/or convert energy.

In the example of FIG. 12, actuated geometry components 78 are additional floats that integrate into body portion 74C, in order to modify the shape and/or buoyancy of body portion 74C. For instance, each of actuated geometry components 78 may include a supplemental float and attached means for raising or lowering the supplemental float. The means for raising or lowering the float may be a motor attached to an arm, a hydraulic piston, a spring device, a rope winch, or any other means for moving the supplemental floats.

In the example of FIG. 12, WEC system 72 includes only two actuated geometry components. In other examples, point absorber WEC systems may include only a single actuated geometry component or any number of actuated geometry components.

Point absorber wave energy conversion systems often include a surface float or floats (e.g., body portion 74C of WEC system 72) that react against a heave plate or the seafloor (e.g., body portion 74B). The natural frequency of a point absorber system can be determined by the mass and the added-mass of the system (e.g., including the float and the spar/plate), the device restoring buoyancy force (which determines hydrostatics stiffness) and the PTO device stiffness and damping.

Through operation of actuated geometry components 78, WEC system 72 has the ability to change the geometry of the float (e.g., body portion 74C), thus changing hydrostatic stiffness and the added mass properties of WEC system 72. In some examples, WEC system 72 may also utilize active ballasting to change the mass prosperities of the float. For example, WEC system 72 may be able to increase and/or decrease an amount of air and/or water stored within body portion 74C.

Figure 13A:
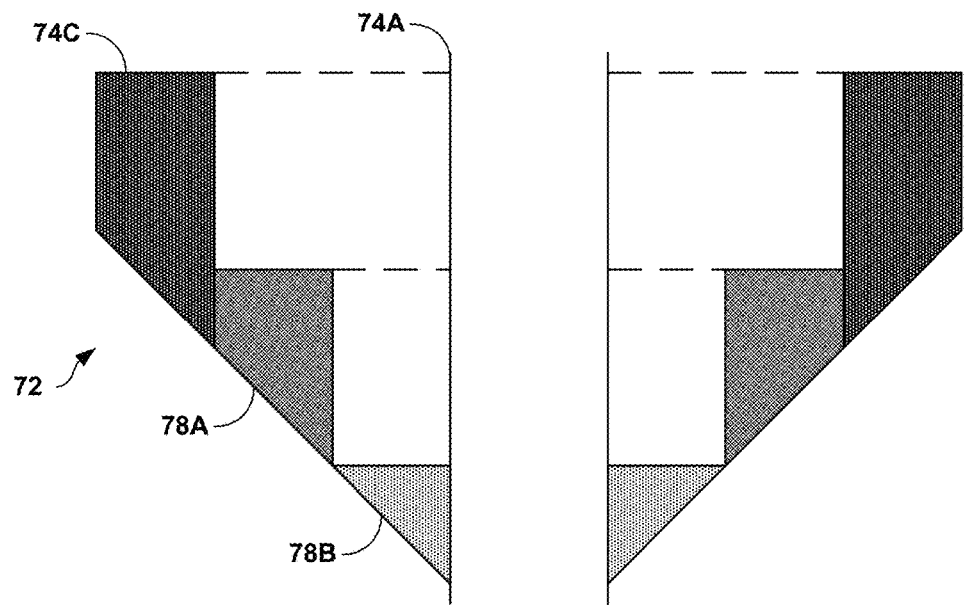
FIGS. 13A and 13B are conceptual diagrams illustrating cross sectional views of a portion of a WEC system, in accordance with one or more aspects of the present disclosure.
Figure 13B:
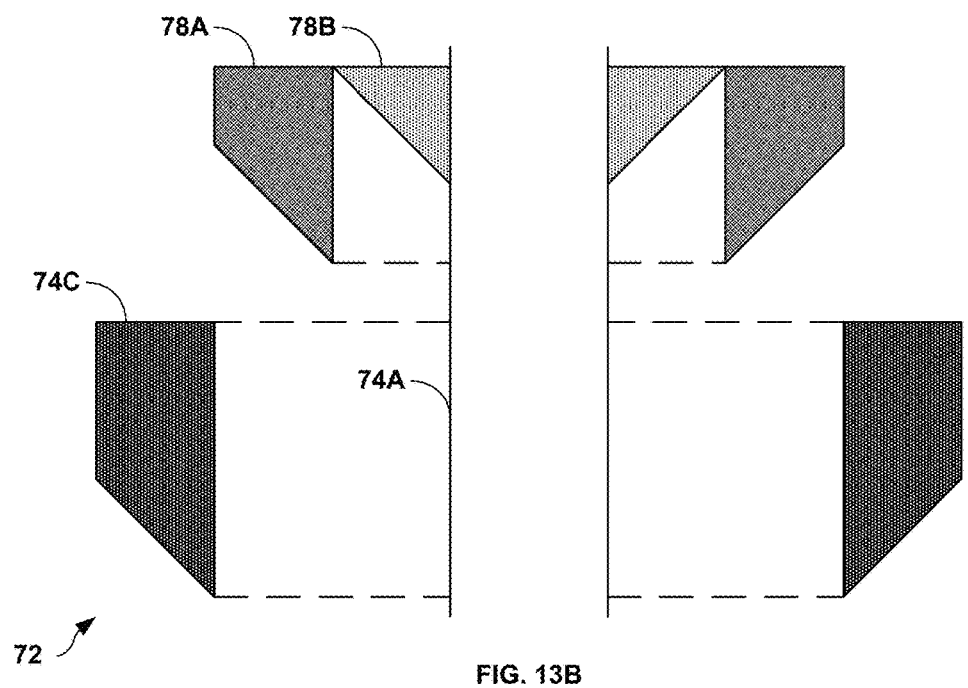

FIGS. 13A and 13B are conceptual diagrams illustrating cross sectional views of a portion of WEC system 72, in accordance with one or more aspects of the present disclosure. Specifically, FIG. 13A shows WEC system 72 with actuated geometry components 78 both in a deployed state and FIG. 13B shows WEC system 72 with actuated geometry components 78 both in a retracted state. FIGS. 13A and 13B are not to scale. The different shading of body portion 74C and actuated geometry components 78 may, in some examples, indicate varying density or buoyancy of the materials.

In the example of FIGS. 13A and 13B, the bottom of the cross-sectional shape of actuated geometry components 78 is triangular. In various examples, however, actuated geometry components 78 may have a cross-section of any suitable shape. The shapes, sizes, densities, and number of actuated geometry components 78 may be varied in different examples, to provide any number of possible options for modification of the geometric profile of body portion 74C.

Figure 14:
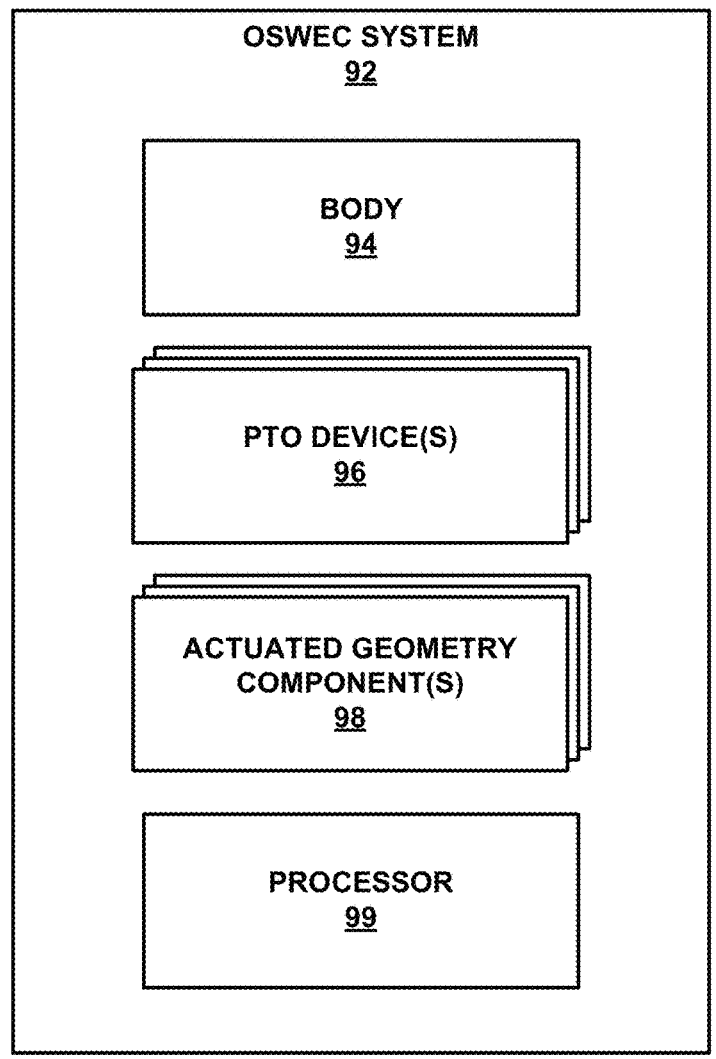
FIG. 14 is block diagram illustrating an example wave energy conversion system, in accordance with one or more aspects of the present disclosure.

FIG. 14 is block diagram illustrating an example WEC system (e.g., WEC system 92), in accordance with one or more aspects of the present disclosure. WEC system 92 represents any WEC system that incorporates actuated geometry as described herein. As shown in FIG. 14, WEC system 92 includes body 94, one or more PTO devices 96, one or more actuated geometry components 98, and processor 99.

In accordance with the techniques described herein, body 94 may be any structure used to harvest wave energy, such as a wall, a plurality of connected floats, a tube-like structure, a buoy-like structure, or any other wave energy conversion system structure. PTO devices 96 may be configured to store and/or convert the energy harvested by body 94 for use. Examples of PTO devices 96 may include turbine generators, air compressors or air pumps, electrical generators, hydraulic actuator, or any other device or system for power take off.

As detailed herein, actuated geometry components 98 include mechanical pieces operable to modify a geometric profile of WEC system 92. For instance, actuated geometry components 98 may be operable to modify a surface area of a surface of body 94, a length, width, or height of a portion of body 94, a buoyancy of a portion of body 94, a distance between two portions of body 94, or any other geometric property of WEC system 92.

Processor 99, in some examples, may be used to control and operate actuated geometry components 98. For instance, processor 99 may receive user input to modify the geometric profile of WEC system 92, and may operate actuated geometry components 98 accordingly. As another example, processor 99 may monitor environmental conditions and automatically operate actuated geometry components 98 based on changing environmental conditions.

By incorporating actuated geometry components 98, WEC system 92 may collect wave energy more efficiently by tailoring its resonant frequency to match current tide conditions. Furthermore, the use of actuated geometry components 98 may allow WEC system 92 to better handle adverse conditions while reducing the risk of system overloading.

Figure 15:
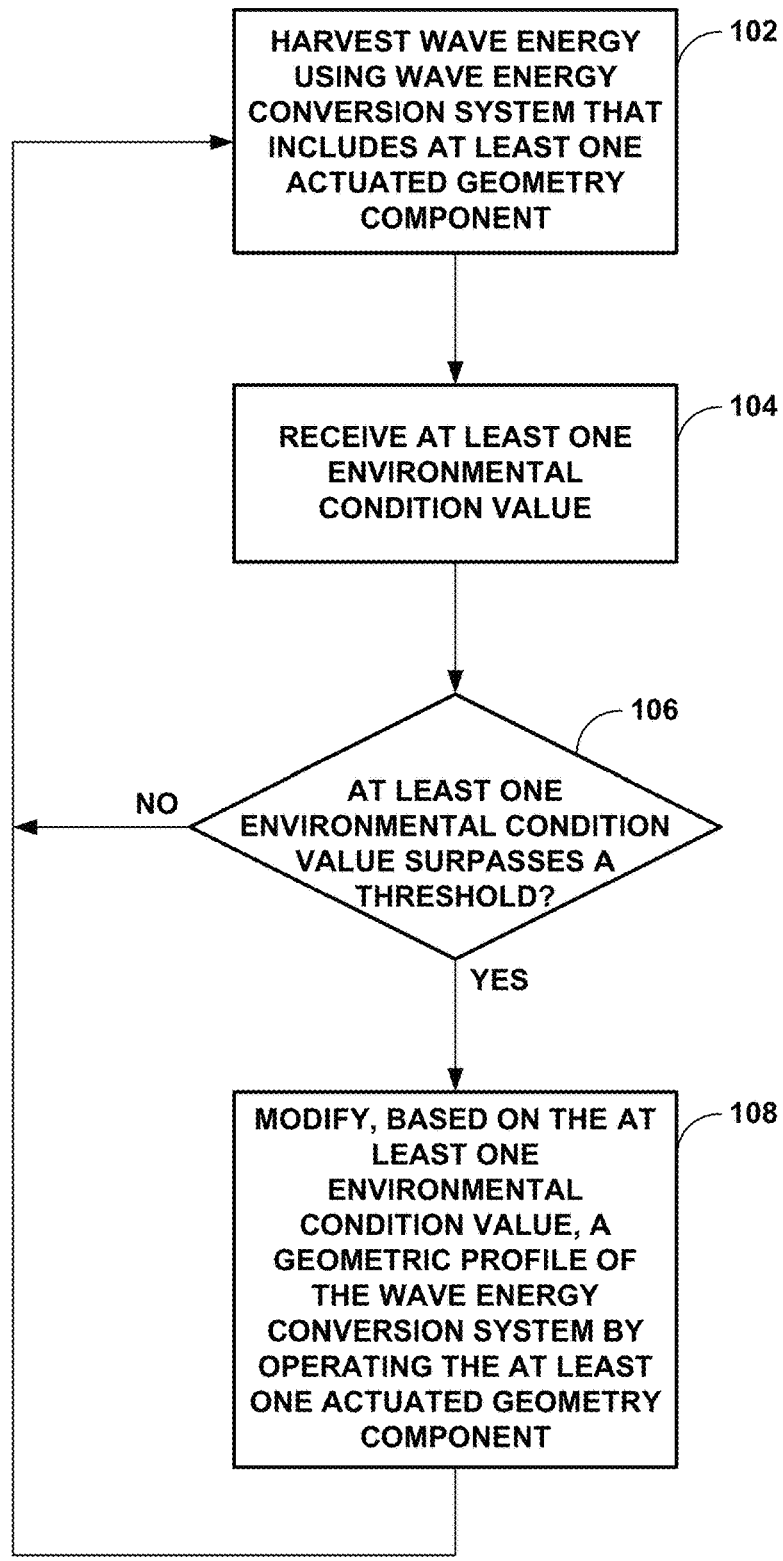
FIG. 15 is a flow diagram illustrating example operations of a WEC system having actuated geometry components, in accordance with one or more aspects of the present disclosure.

FIG. 15 is a flow diagram illustrating example operations of a WEC system having actuated geometry components, in accordance with one or more aspects of the present disclosure. For ease of understanding, the example operations shown in FIG. 15 are described in the context of WEC system 92 shown in FIG. 14. In various examples, the operations shown in FIG. 15 may include additional or different operations in accordance with the techniques described herein.

In the example of FIG. 15, a method includes harvesting wave energy using a wave energy conversion system that includes at least one actuated geometry component (102). For instance, WEC system 92, which includes actuated geometry components 98, may be used to harvest the wave energy.

The method also includes receiving at least one environmental condition value (104). For example, processor 99 of WEC system 92 may receive data (e.g., from one or more sensors) indicating the value of an environmental condition. Environmental conditions may include air temperature information, barometric pressure information, time of day, day of the year, tidal conditions, wave frequency, wave amplitude, water temperature, water depth, water content, proximity of life, or any other information about the environment surrounding WEC system 92.

The method further includes determining whether the at least one environmental condition value surpasses a threshold (106). For instance, processor 99 of WEC system 92 may compare the environmental condition value to a threshold to determine whether the value surpasses the threshold. In some examples, the threshold may be hard coded into processor 99. In some examples, the threshold may be provided as user input. In some examples, the threshold may be a variable (e.g., stored in a storage device) accessible to processor 99. If the environmental condition value does not surpass the threshold ("NO" branch of operation 106), actuated geometry components 98 of WEC system 92 may remain unchanged, and WEC system 92 may continue to harvest wave energy.

The method also includes, responsive to the environmental condition value surpassing the threshold ("YES" branch of operation 106), modifying, based on the at least one environmental condition value, a geometric profile of the wave energy conversion system by operating the at least one actuated geometry component. For example, processor 99 may operate one or more of actuated geometry components 99 in order to modify the geometric profile of WEC system 92, as detailed herein. As a result, WEC system 92 may improve the efficiency of energy harvesting and/or ensure safer operation.

The systems, techniques, and operations disclosed herein may be additionally or alternatively described by one or more of the following examples.

Example 1

A system comprising: at least one body portion configured to transfer wave energy to a power take off device; and at least one actuated geometry component that is connected to the at least one body portion, the at least one actuated geometry component operable to modify a geometric profile of the system.

Example 2

The system of example 1, further comprising a processor communicatively coupled to the at least one actuated geometry component, wherein the processor is configured to: receive at least one environmental condition value; and operate the at least one actuated geometry component based on the at least one environmental condition value.

Example 3

The system of example 2, wherein the environmental condition value comprises a value of at least one of: an air temperature, a barometric pressure, a water temperature, a time of day, a wave frequency, a wave amplitude, a wave pressure, a water density, or an amount of ambient light.

Example 4

The system of any of examples 1-3, wherein modifying the geometric profile of the system comprises modifying an area of a surface of the at least one body portion.

Example 5

The system of any of examples 1-3, wherein: the at least one body portion comprises at least two body portions; and modifying the geometric profile of the system comprises modifying a distance between the at least two body portions.

Example 6

The system of any of examples 1-3, wherein modifying the geometric profile of the system comprises modifying a size of the at least one body portion.

Example 7

The system of any of examples 1-6, wherein: the at least one body portion comprises an approximately flat, rectangular frame having a front surface; the at least one body portion includes at least one opening in the front surface; the at least one actuated geometry component comprises at least one fin disposed within the at least one opening, the at least one fin having a surface; and the at least one fin is configured to rotate with respect to the front surface of the rectangular frame, thereby modifying an angle between the surface of the at least one fin and the front surface of the rectangular frame.

Example 8

The system of example 7, wherein: the at least one opening comprises a plurality of openings in the front surface; the at least one fin comprises a plurality of fins, each disposed within a respective one of the plurality of openings; and each of the plurality of fins is configured to rotate independently of one another.

Example 9

The system of any of examples 7-8, wherein a cross section of the at least one fin is approximately: linear, rectangular, elliptical, or lenticular.

Example 10

The system of any of examples 1-6, wherein: the at least one body portion comprises a first floater and a second floater; the at least one actuated geometry component comprises a variable length connecter between the first floater and the second floater; and the variable length connecter is configured to modify a distance between the first floater and the second floater.

Example 11

The system of example 10, wherein the variable length connecter comprises: a substantially rigid spar between the first floater and the second floater; and at least one extension means, within at least one of the first floater or the second floater, operable to modify a length of the substantially rigid spar.

Example 12

The system of any of examples 10-11, wherein: the at least one body portion further comprises a third floater; and the variable length connecter comprises a first variable length connector; the at least one actuated geometry component further comprises a second variable length connector between the second floater and the third floater; and the second variable length connector is configured to modify a distance between the second floater and the third floater.

Example 13

The system of any of examples 1-6, wherein: the at least one body portion comprises a tube-like structure that has a first end and a second end, the first end being substantially open, and the second end being substantially closed; the at least one actuated geometry component comprises at least one extension piece; and the at least one extension piece is configured to modify at least one of: a length of the tube-like structure, a cross-sectional area of at least a portion of the tube-like structure, or a cross-sectional shape of at least a portion of the tube-like structure.

Example 14

The system of example 13, wherein: the first end of the tube-like structure is submerged below a water surface; the second end of the tube-like structure is above the water surface; and the second end of the tube-like structure is substantially filled with a compressible fluid.

Example 15

The system of any of examples 1-14, further comprising the power take off device.

Example 16

The system of any of examples 1-15, further comprising a base portion that connects the at least one body portion to a floor of a body of water.

Example 17

The system of any of examples 1-16, wherein modifying a geometric profile of the system comprises changing a resonant frequency of the system.

Example 18

A method comprising: harvesting wave energy using a wave energy conversion system that includes at least one actuated geometry component; receiving, by a processor, at least one environmental condition value; determining, by the processor, whether the at least one environmental condition value surpasses a threshold; and responsive to determining that the at least one environmental condition surpasses the threshold, modifying, by the processor and based on the at least one environmental condition value, a geometric profile of the wave energy conversion system by operating the at least one actuated geometry component.

Example 19

The method of example 18, wherein the environmental condition value comprises a value of at least one of: an air temperature, a barometric pressure, a water temperature, a time of day, a wave frequency, a wave amplitude, a wave pressure, a water density, or an amount of ambient light.

Example 20

The method of any of examples 18-19, wherein modifying the geometric profile of the wave energy conversion system comprises at least one of: modifying an area of a surface of at least one portion of a body of the wave energy conversion system; modifying a size of the at least one portion of the body; modifying a distance between a first portion of a body of the wave energy conversion system and a second portion of a body of the wave energy conversion system; and changing a resonant frequency of the system.

In one or more examples, at least some of the functions described herein may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media, which includes any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable storage medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of inter-operative hardware units, including one or more processors as described above, in conjunction with suitable software and/or firmware.

The foregoing disclosure includes various examples set forth merely as illustration. The disclosed examples are not intended to be limiting. Modifications incorporating the spirit and substance of the described examples may occur to persons skilled in the art. These and other examples are within the scope of this disclosure and the following claims.

What is claimed is:

1. A system comprising:
   a body comprising an approximately planar frame having a front surface and at least one opening extending through the body, wherein the body is configured to:
     connect to a power take off device; and
     during operation, transfer wave energy to the power take off device via movement of the body relative to the power take off device; and
   at least one fin disposed within the at least one opening and coupled to the body, the at least one fin operable to modify at least one of a size of the at least one opening or a shape of the at least one opening by rotating to modify an angle between the surface of the at least one fin and the front surface of the frame.

2. The system of claim 1, further comprising a processor, wherein:
   the processor is communicatively coupled to the at least one fin, and
   the processor is configured to:
     receive at least one environmental condition value; and
     operate the at least one fin based on the at least one environmental condition value.

3. The system of claim 2, wherein the environmental condition value comprises a value of at least one of: an air temperature, a barometric pressure, a water temperature, a time of day, a wave frequency, a wave amplitude, a wave pressure, a water density, or an amount of ambient light.

4. The system of claim 1, wherein:
   the at least one opening comprises a plurality of openings that each extend through the frame,
   the at least one fin comprises a plurality of fins, each disposed within a respective one of the plurality of openings, and
   at least two fins in the plurality of fins are operable to rotate independently of one another.

5. The system of claim 1, wherein a cross section of the at least one fin is approximately: linear, rectangular, elliptical, or lenticular.

6. The system of claim 1, further comprising a base portion that connects the system to a floor of a body of water.

7. The system of claim 1, wherein modifying the at least one of the size of the at least one opening or the shape of the at least one opening changes a resonant frequency of the system.

8. A method comprising:
   harvesting wave energy using a wave energy conversion system that comprises:
     a body comprising an approximately planar frame having a front surface and at least one opening extending through the body, wherein the body is configured to:
       connect to a power take off device, and
       during operation, transfer the wave energy to the power take off device via movement of the body relative to the power take off device; and
     at least one fin disposed within the at least one opening and attached to the body, the at least one fin operable by a processor that is communicatively coupled to the at least one actuated geometry component to modify at least one of a size of the at least one opening or a shape of the at least one opening;

receiving, by the processor, at least one environmental condition value;

determining, by the processor, whether the at least one environmental condition value surpasses a threshold; and responsive to determining that the at least one environmental condition surpasses the threshold, operating, by the processor and based on the at least one environmental condition value, the at least one fin to modify the at least one of the size of the at least one opening or the shape of the at least one opening.

9. The method of claim 8, wherein the environmental condition value comprises a value of at least one of: an air temperature, a barometric pressure, a water temperature, a time of day, a wave frequency, a wave amplitude, a wave pressure, a water density, or an amount of ambient light.

10. The method of claim 8, wherein operating the at least one fin to modify the at least one of the size of the at least one opening or the shape of the at least one opening changes a resonant frequency of the wave energy conversion system.

11. The system of claim 2, wherein:
the at least one fin may be rotated by the processor between at least a first position and a second position,
when in the first position, the surface of the at least one fin is substantially parallel to the front surface of the frame, and
when in the second position, the surface of the at least one fin is substantially perpendicular to the front surface of the frame.

12. The system of claim 1, wherein the at least one fin is configured to be substantially unmovable with respect to the body by waves during operation.

13. The method of claim 8, wherein:
the at least one fin may be rotated by the processor between at least a first position and a second position,
when in the first position, the surface of the at least one fin is not substantially perpendicular to the front surface of the frame,
when in the second position, the surface of the at least one fin is substantially perpendicular to the front surface of the frame,
operating the at least one fin comprises rotating the at least one fin to the second position, and
the method further comprises:
responsive to determining that the at least one environmental condition does not surpass the threshold, rotating the at least one fin to the first position.

14. A device comprising:
a body having:
an approximately planar shape;
an approximately rectangular front surface; and
an approximately rectangular back surface that is substantially parallel to the front surface,
wherein:
the body comprises at least one opening that extends from the front surface, through the body, and to the back surface, and wherein the at least one opening is substantially horizontal,
the body is configured to be connected at a bottom end to a power take off device, and
during operation, the body is configured to transfer wave energy to the power take off device by rotating around a first axis extending in the horizontal direction, through the power take off device;
at least one fin, disposed in the at least one opening, having a front surface and configured to rotate around a second axis extending in the horizontal direction, parallel to the front surface, wherein:
the at least one fin obstructs a majority of the at least one opening when the at least one fin is in a first position, and
the at least one fin does not obstruct a majority of the at least one opening when the at least one fin is in a second position; and
a processor operatively coupled to the at least one fin, the processor configured to rotate the fin between at least the first position and the second position.

* * * * *